(12) United States Patent
Uribe

US008972042B2

(10) Patent No.: US 8,972,042 B2
(45) Date of Patent: Mar. 3, 2015

(54) FOR TRANSFERRING AND ORGANIZING ARTICLES FROM A SHELF INTO A CONTAINER

(76) Inventor: Juan Uribe, Peoria, AZ (US)

( * ) Notice: Subject to any disclaimer, the term of this patent is extended or adjusted under 35 U.S.C. 154(b) by 0 days.

(21) Appl. No.: 11/697,657

(22) Filed: Apr. 6, 2007

(65) Prior Publication Data

US 2007/0237610 A1   Oct. 11, 2007

Related U.S. Application Data

(60) Provisional application No. 60/790,346, filed on Apr. 6, 2006.

(51) Int. Cl.
*G06F 7/00* (2006.01)
*B65G 1/137* (2006.01)
*B65G 1/02* (2006.01)

(52) U.S. Cl.
CPC .............. *B65G 1/1373* (2013.01); *B65G 1/026* (2013.01)
USPC ............ 700/216; 700/213; 700/214; 700/228

(58) Field of Classification Search
USPC ......................................... 700/216, 214, 213
See application file for complete search history.

(56) References Cited

U.S. PATENT DOCUMENTS

| | | | |
|---|---|---|---|
| 3,782,565 A | | 1/1974 | Doran et al. |
| 4,416,653 A | * | 11/1983 | Breski et al. ................. 493/412 |
| 5,161,929 A | | 11/1992 | Lichti et al. |
| 5,171,120 A | | 12/1992 | Bernard et al. |
| 5,230,206 A | | 7/1993 | Christ |
| 5,380,139 A | * | 1/1995 | Pohjonen et al. ............. 414/280 |
| 5,588,790 A | * | 12/1996 | Lichti ....................... 414/331.03 |
| 6,318,956 B1 | | 11/2001 | Kobacker et al. |
| 6,431,378 B1 | * | 8/2002 | Lewis ........................... 211/151 |
| 6,529,801 B1 | | 3/2003 | Rosenblum |
| 6,733,222 B2 | * | 5/2004 | Freudelsperger ............. 414/276 |
| 6,892,941 B2 | | 5/2005 | Rosenblum |
| 6,974,928 B2 | | 12/2005 | Bloom |
| 7,413,398 B2 | * | 8/2008 | Bangert et al. ............. 414/745.2 |
| 2001/0020196 A1 | | 9/2001 | Cirrone |
| 2002/0178074 A1 | | 11/2002 | Bloom |
| 2002/0182035 A1 | * | 12/2002 | Karlen ....................... 414/143.2 |

(Continued)

FOREIGN PATENT DOCUMENTS

| | | |
|---|---|---|
| EP | 408584 B1 | 1/1997 |
| EP | 1136395 B1 | 1/2001 |

(Continued)

*Primary Examiner* — Yolanda Cumbess
(74) *Attorney, Agent, or Firm* — Thomas W. Galvani, P.C.; Thomas W. Galvani

(57) ABSTRACT

The present example of transferring and organizing articles from a shelf into a container, (or "controlled transfer and packing") also allows a warehouse distribution system to be provided that receives items from a manufacturer or distributor, and boxes or packages the items to produce a shipment to another reseller, or customer, according to a received order in a way that may be efficient than current methods. In particular, the system makes use of a specialized floor plan and equipment that aids in processing the order according to the pricing methods described. The processing also provides an example of transferring and organizing articles from a shelf into a container that controls article tumble when loading the article into a container that tends to increase packing efficiency. Loading of items to be packed into magazines to aid transferring of articles from a shelf into a container is also described.

8 Claims, 36 Drawing Sheets

(56) References Cited

U.S. PATENT DOCUMENTS

| | | | |
|---|---|---|---|
| 2005/0002772 A1* | 1/2005 | Stone | 414/788 |
| 2005/0049746 A1 | 3/2005 | Rosenblum | |
| 2006/0020366 A1 | 1/2006 | Bloom | |
| 2008/0282719 A1* | 11/2008 | Fung | 62/255 |
| 2011/0106295 A1* | 5/2011 | Miranda et al. | 700/216 |

FOREIGN PATENT DOCUMENTS

| | | |
|---|---|---|
| JP | 7187330 | 7/1995 |
| JP | 7187331 | 7/1995 |
| WO | WO 00/44649 | 8/2000 |
| WO | WO 01/95276 A2 | 12/2001 |

* cited by examiner

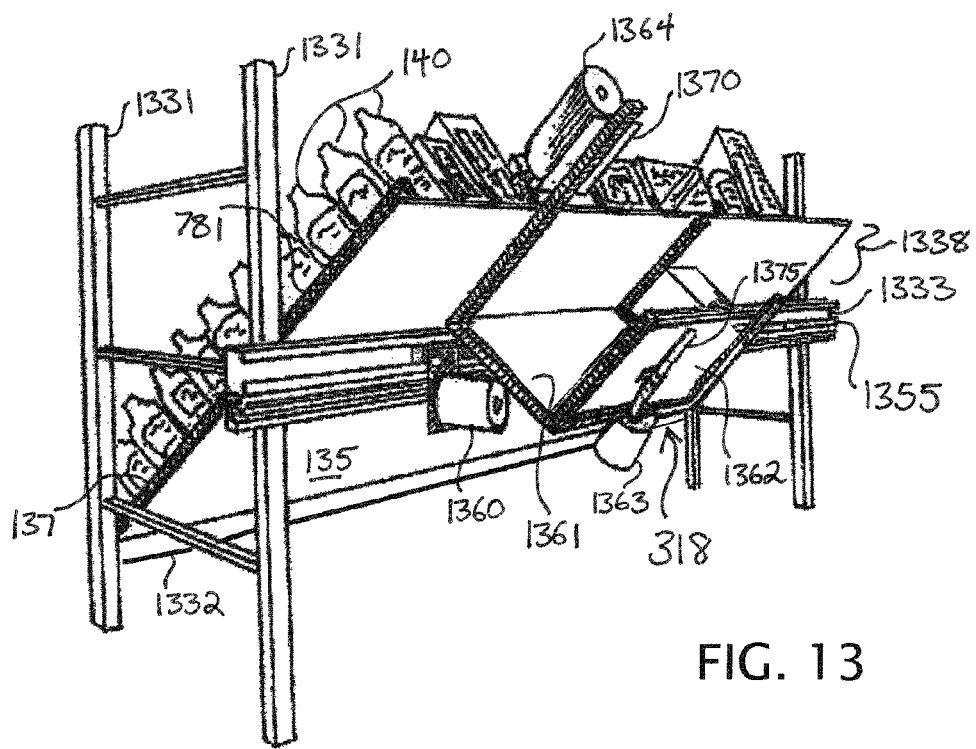
FIG. 13
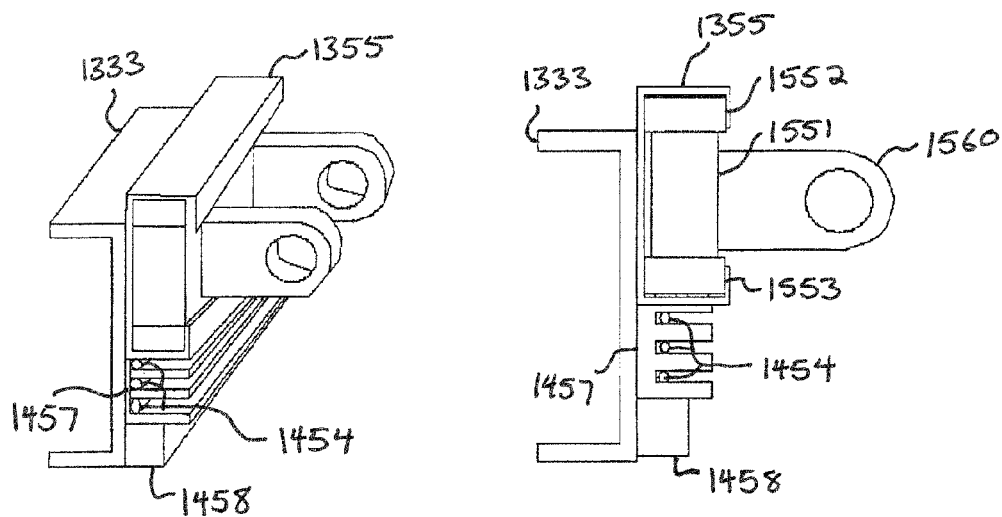
FIG. 14
FIG. 15

Determine transfer tumble control 555

FOR TRANSFERRING AND ORGANIZING ARTICLES FROM A SHELF INTO A CONTAINER

CROSS-REFERENCE TO RELATED APPLICATION

This application claims the benefit of U.S. Provisional Patent Application No. 60/790,346 filed Apr. 6, 2006, the contents of which are hereby incorporated by reference.

TECHNICAL FIELD

This description relates generally to automatically transferring articles from a shelf and organizing those articles into a container without regard for the articles' different shapes or packaging format. More specifically, this description relates to picking and packing articles included in inventory replenishing orders, processed in distribution or fulfillment centers or the like and are then delivered to retail locations or directly to customers.

BACKGROUND

Distribution centers are generally operated by wholesale and retail businesses, fulfillment houses and e-retailers. Distribution centers may receive periodic inventory replenishment orders from stores, wholesale clients or directly from customers. To fill these orders, distribution center employees typically read each order and proceed to pull the ordered articles from inventory shelves. At the end of that process, the picked articles are typically packed into shipping containers. The shipping containers are then usually sent to their final destinations. In the past, the execution of these orders has been typically done utilizing manual labor. However, strong industry trends toward order fulfillment cost reduction combined with just-in-time replenishing requirements have created a demand for a more responsive, less costly and more efficient order fulfillment methodology. As a result, many businesses, especially retailers, have adopted "broken-case" inventory replenishment methodology.

"Broken-case" inventory replenishment means that orders are filled in small quantities, typically less than a full case. Therefore, cases of products must be opened, thus the term broken-case and articles removed from those broken cases to fill replenishment or customers' orders.

Unfortunately, the benefits of broken case replenishing can carry a huge increase in operational cost. Additionally, customer service level expectations continue to put pressure upon distribution and fulfillment operations. Because of the above mentioned reasons, many retailers have identified chain supply logistics and specially inventory replenishing (order fulfillment), as strategic functions where competitive advantage can be realized and maintained.

In an effort to control the ever-increasing cost of order fulfillment, distribution and fulfillment centers are typically making extensive use of computer aided inventory replenishment techniques. Computer aided inventory replenishment has helped distribution operations realize better efficiencies than in the past. However, these techniques can suffer drawbacks, and virtually all of them are heavily dependant on manual labor. This dependence on manual labor, can translate into continuously increasing uncertainty, risk and financial costs to replenishing operations.

Hence, there may be a need for order fulfillment that improves on one or more of the drawbacks mentioned above. Namely, order fulfillment that is inexpensive, easy to implement and interface in existing distribution centers and which reduces reliance on human labor in the picking and packing operations while improving overall inventory flow. The present examples of transferring and organizing articles from a shelf into a container, addresses one or more of these needs.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example of transferring and organizing articles from a shelf into a container, (or "controlled transfer and packing") also allows a warehouse distribution system to be provided that receives items from a manufacturer or distributor, and boxes or packages the items to produce a shipment to another reseller, or customer, according to a received order in a way that may be efficient than current methods. In particular, the system makes use of a specialized floor plan and equipment that aids in processing the orders according to the pricing methods described. The processing also provides an example of transferring and organizing articles from a shelf into a container that controls article tumble when loading the article into a container that tends to increase packing efficiency. Loading of items to be packed into magazines to aid transferring of articles from a shelf into a container is also described.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 13 shows the pick trolley of the controlled transfer and packing facility that may be used to load items from shelves into storing boxes.

FIG. 14 and FIG. 15 show a C-channel rail, which serves as guide to pick trolley and clip trolley.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a packing facility for transferring and organizing articles from a shelf into a container. Although the present examples are described and illustrated herein as being implemented in a warehouse picking and packing system, the system described is provided as an example and not a limitation. As those skilled in the art will appreciate, the present examples are suitable for application in a variety of different types of order assembly and packaging systems.

This description discloses transferring articles from a shelf into a container while at the same time positioning the articles in predetermined spaces inside said container. Also disclosed, are associated processes to support the application of the system and method of transferring articles from a shelf into a container, in an order fulfillment environment.

Figure 1:
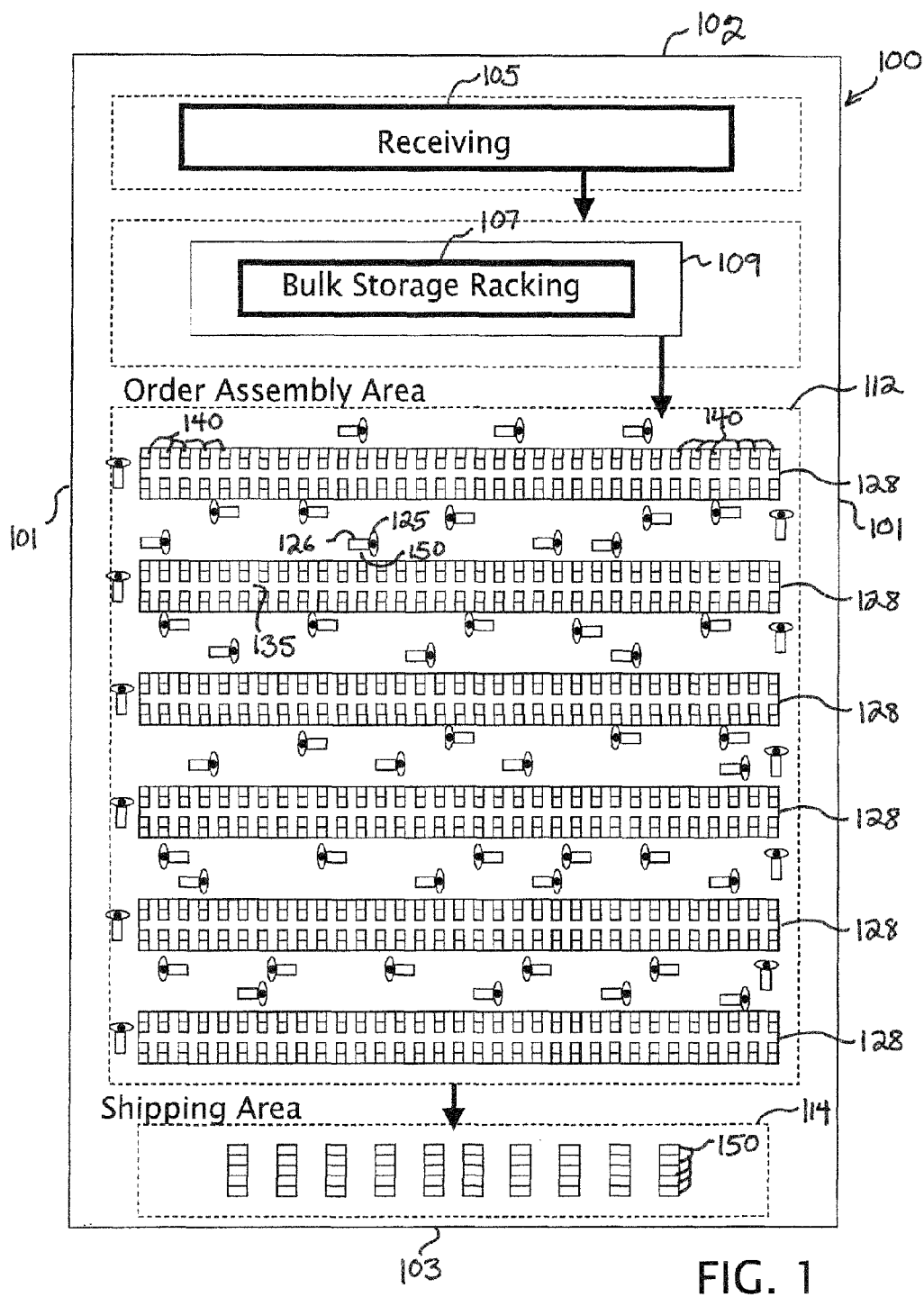
FIG. 1 is a simplified perspective view of a typical distribution center.

FIG. 1 is a simplified perspective view of a typical distribution center. In FIG. 1, the basic sequence of material flow operations carried-out in a typical distribution center is depicted in general terms. These four main operations are: receiving, bulk storage, order assembly and shipping. From brief description of the drawings, in this figure, a typical distribution center floor plan 100 is presented. A distribution center typically includes at least two sidewalls 101, one back wall 102, one front wall 103, a material receiving area 105, a bulk storage area 109, bulk storage racking 107, an order assembly area 112 where human accessible rack shelving 128 is located and loaded with articles 140, pickers 125 pushing article gathering carts 126 carrying one or more containers 150 where articles 140 picked from planar shelf surfaces 135 are placed.

Figure 2:
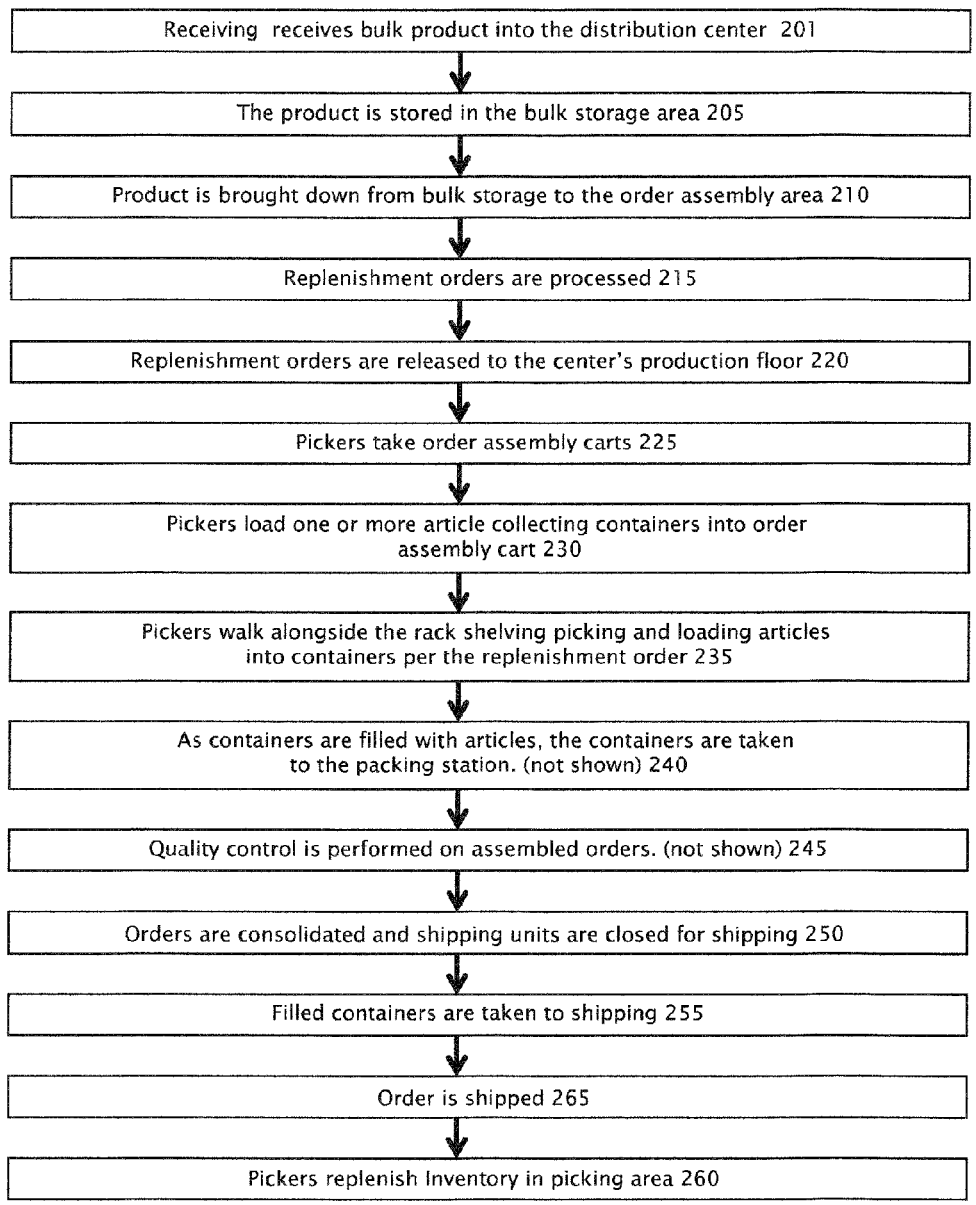
FIG. 2 is a flow chart showing the general sequence of typical material flow operations in a typical distribution center.

FIG. 2 is a flow chart showing the general sequence of current processes of typical material flow operations in a typical distribution center. First, manufacturers and suppliers send payloads of product to the distribution center. At the distribution center, receiving receives bulk product into the distribution center 201. Next, the product is typically stored in the bulk storage area 205. Then, the product is typically brought down from bulk storage to the order assembly area 210, where it is typically stored until a replenishment order is filled. Then, as replenishment orders are received replenishment orders are processed 215 by computer software. Replenishment orders are then released to the personnel on the distribution center's production floor 220. To fill the order, pickers obtain and load one or more article collecting containers into order assembly carts 225, they have acquired. Pickers walk alongside the rack shelving picking and loading articles into containers per the replenishment order 235. As containers are filled with articles, the containers are taken to the packing station (not shown) 240. Quality control is often performed on assembled orders 245 at the packing station (not shown). Next, orders are consolidated and shipping units are closed for shipping 250. Then, the filled containers are taken to shipping 255 where orders are shipped 265. Order assembly area shelves are replenished with inventory, brought down from bulk storage by distribution center personnel 260.

Figure 3:
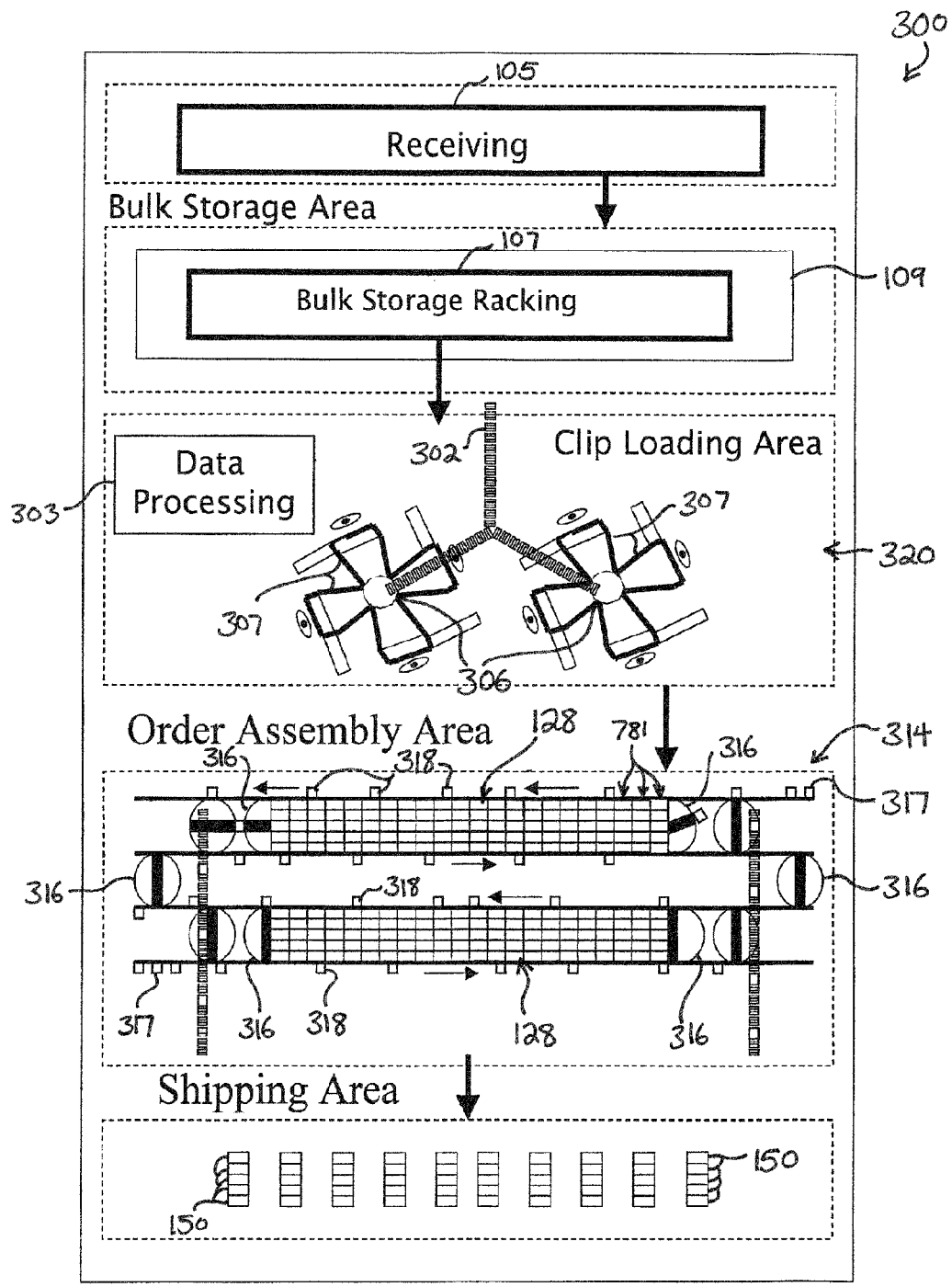
FIG. 3 depicts an example of the distribution center's new floor plan layout which accommodates the necessary equipment for the new sequence of material flow operations carried-out when the distribution center is fitted as a controlled transfer and packing facility.

FIG. 3 depicts an example of the distribution center's new floor plan layout 300 which accommodates the necessary equipment for the new sequence of material flow operations carried-out when the distribution center is fitted to implement controlled transfer and packing Five operations can be carried out in this layout: receiving, bulk storage, transfer channel clip loading, order assembly and shipping. Receiving, bulk storage and shipping may be performed as previously described. The transfer channel clip loading process and the order assembly process are provided to implement controlled transfer and packing, which may require specialized equipment. As shown, the distribution center floor plan has a clip loading area 320, including two anti-gravity tables 306 fed by conveyor 302, a data processing facility 303, an order assembly area 314 with human accessible rack shelving 128. While continuing to be human accessible, the rack shelving 128 is fitted with a track railing infrastructure 319, which carries the pick trolleys 318 and the clip trolleys 317 that may utilize controlled transfer and packing to load chipping boxes. On the rack shelving 128, are the transfer channel clips 781 containing the articles 140 that will be loaded into the pick trolley's containers 150. Attached to both ends of the rack shelving, are the turning turrets 316, which convey pick and clip trolleys from one picking side to another or to a different planar shelf surface level 135. Located in between the rack shelves 128, are similar turning turrets 316 which facilitate the navigation of pick 318 and clip 317 trolleys between different rack shelves 128.

Figure 4:
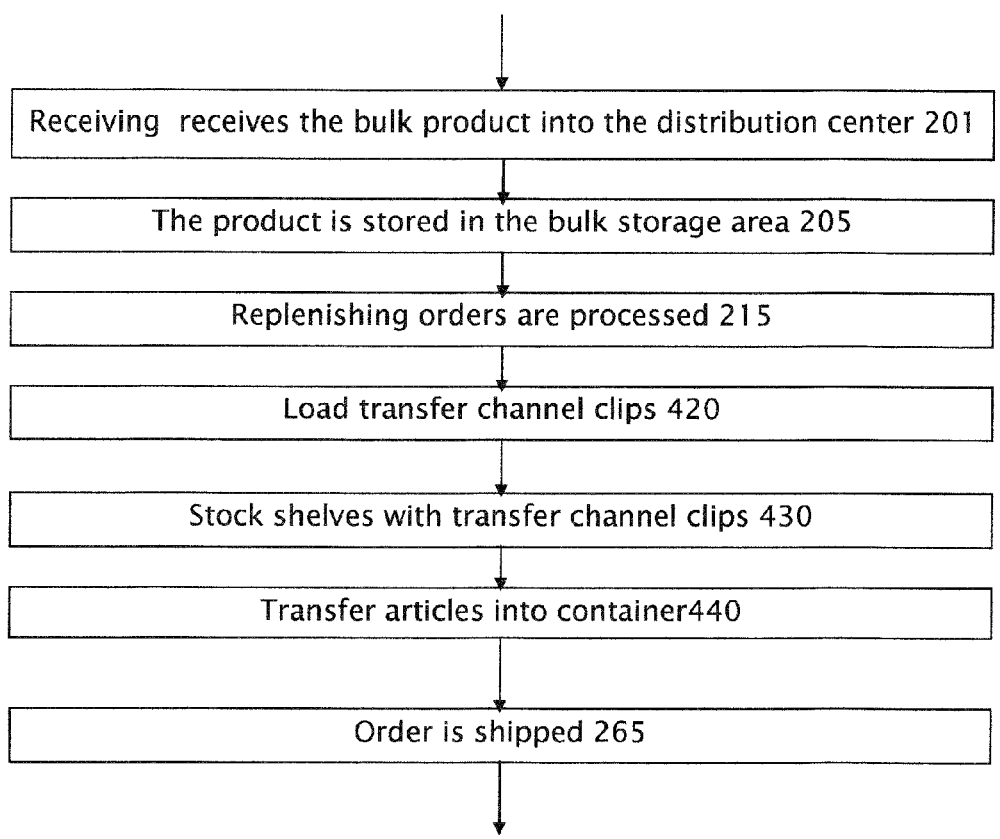
FIG. 4 is a flow chart of the new sequence of material handling operations for a distribution center that is fitted as a controlled transfer and packing facility.

FIG. 4 is a flow chart showing the new sequence of material handling operations for a distribution center that is fitted as a controlled transfer and packing facility. First, the processes of receiving 201, bulk storage 205 and shipping 265 are performed in the manner previously described. In the new sequence of operations, orders are received by the control software and are processed 215 by the control software to make them ready for order assembly. The computer software also releases transfer channel clip loading directions to the personnel in the distribution center's production floor to make sure items needed are available for packing. Transfer channel clips are loaded 420 with articles, which will be picked and packed to assemble orders. The loaded transfer channel clips 781 are then carried by the clip trolleys 317, also known as replenishing trolleys, and disposed on the rack shelving 430 inside the order assembly area. Next, order assembly requests are typically distributed to substantially all pick trolleys 318 at once. The pick trolleys 318 rides along the rack shelving 128 and assemble the orders by transferring articles from the shelves into shipping containers 440. Prior to transferring an item into the shipping container 440, quality control, to ascertain the correct item is being transferred per replenishment order request, may be performed (not shown). Full shipping containers 150 can then sent to the shipping area 114 and sent to their final destinations 265.

Figure 5:
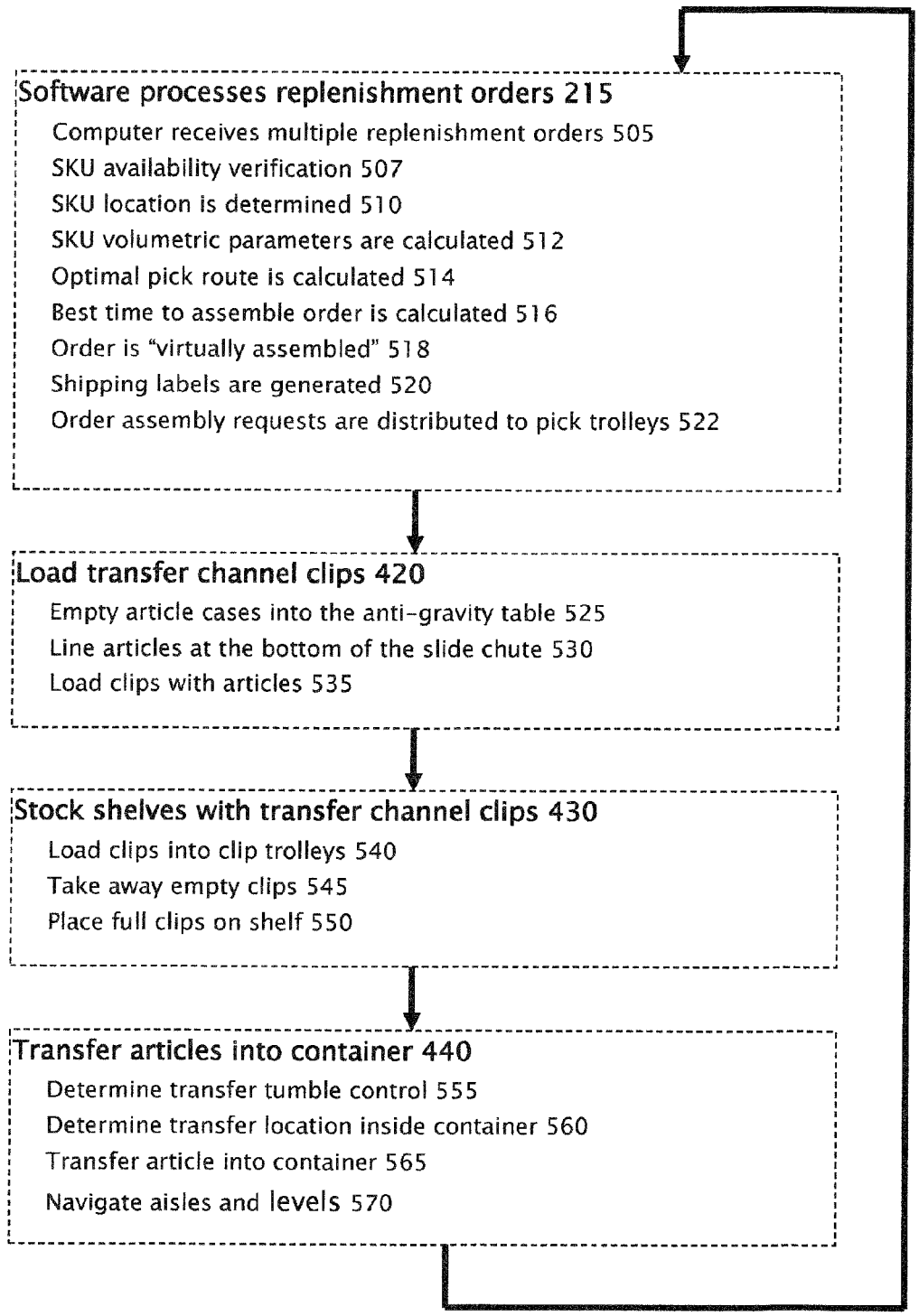
FIG. 5 is a flow chart showing further detail of the presence of processing replenishing order, loading transfer channel clips, stocking shelves with transfer channel clips and transfer article into a container.

FIG. 5 is a flow chart showing further detail of the process of processing replenishing orders 215, loading transfer channel clips 420, stock shelves with transfer channel clips 430, and transferring articles into a container 440. The process begins when the computer software that controls all operations related to order fulfillment receives replenishment order data from the host system or directly from stores or customers via ASCII or XML 505 or this equivalent. The control software is an application program suitable for execution on a conventional PC, mainframe or disturbed computer system. The controller software then verifies that the articles included in the order are in the inventory at hand 507. Next, the control software determines the location of the requested articles within the distribution center 510. Once availability and location are established, the control software uses product information furnished by the manufacturers, such as weight, height, width and thickness data to calculate the volume required 512 by each item when loaded into the shipping container 150. Once those calculations are made, an optimal picking route is determined 514, which accounts for all articles' positions inside the shipping container 150. Then, the control software prepares an order release schedule that takes advantage of the best time to release each order to comply with "just-in-time" fulfillment methodology 516. When the order is ready to be released to the picking trolleys in production floor, shipping labels are generated 520. These shipping labels are applied to each shipping container 150 by a label printer, which may be attached to each picking trolley 317. Orders are now ready to be released simultaneously to all available picking trolleys 522 for the present picking cycle.

During the transfer channel clips loading process 420, bulk packaged, generally in pallets or cases, product are brought down from bulk storage 107. The packages are opened and articles are emptied into the center of the anti-gravity tables 525. The anti-gravity tables 306 then proceed to vibrate and distribute the articles to the sliding chutes, which are slanted downward and also vibrate to cause the articles to slide down towards the bottom of the slide chutes and away from the tables' centers. Once the articles reach the bottom of the slide chute, operators line up the articles on a formation that parallels the slide chute's retaining wall 530. Once sufficient items are lined up, the operator releases the trap door that serves as the flooring of the slide chute, causing all articles to fall, at substantially the same time into the transfer channel clip that has been previously positioned underneath the trap door via a conveyor belt 535.

To stock the picking shelves with loaded transfer channel clips, the article loaded transfer channel clips may be loaded into the clip trolleys. The clip trolleys enter the dual use C-channel transport medium that is attached, and is the conduit infrastructure to the rack shelving, and proceed to deposit the loaded transfer channel clips on the order assembly area shelves. To do this, the clip trolleys first arrive to a pre-determined location and if there is an empty transfer channel clip, the empty clip is removed by the clip trolley and a full transfer channel clip is set in its place. The location is then validated, via wireless communication (or equivalent methods, including hard wired connector), between the clip trolley and the controller software. The stocking of the picking shelves process can take place at the same time that order assembly is taking place. This allows for dynamically changing an article's location to make it more easily accessible to a picking trolley for faster order assembly. In addition, this dynamic process allows for simultaneously picking and replenishing the order assembly area doing away with the need to stop one process to carry out the other.

The process of transferring articles from the shelf into the container begins by determining the desired amount of tumble control when transferring each article. It may be desirable to have a way to control the transfer behavior of an article as it goes from the shelf and into the container. To control the transfer behavior, the shelf's transferring edge is raised, in relation to its opposite end in such a way the transfer channel clip form an angle with respect to a horizontal plane. The picking trolley is also tilted in such a manner that it maintains substantially orthogonal to the transfer channel clip. As the tilt angle is increased, the article's projected center of gravity stays within the transfer channel clip's floor. The article then can be made to transfer into the container without tumbling. Moreover, the tilt angle can me modulated to slow down the article's transferring to the point that a vibration should have to be introduced to usher the article away from the transfer channel and into the container.

Once the optimal transfer angle has been determined, the container may be positioned in a manner that the space that has been pre-determined to be occupied by the transferring article is directly underneath its transfer channel. This can be done by moving the container towards or away and to the right or left with respect to the transfer channel location (in the X and Y directions with respect to the transfer channel transferring edge).

To transfer the article from the shelf into the container, the control software instructs pick trolley to select and load the appropriate size container, place a shipping label on the container and proceed to the location of the first article to be transferred. Once the pick trolley reaches the desired location, it can perform pre-emptive quality control by capturing an image of the article to be picked. The pick trolley compares the captured image to the one passed to it along with the order request and verifies that the article on the shelf is in fact the requested article. The pick trolley then powers the non-orthogonal coupler's motor. The non-orthogonal coupler advances and reaches over to the shelf and engages transfer channel's the lead screw. Power is continually applied causing the lead screw to turn and push the articles in the transfer channel towards the transferring edge. The article that is closest to the transferring edge begins to come out of the transfer channel clip, eventually falling out of the transfer channel clip and into the pre-assigned space inside the container. A vibration, produced by the non-orthogonal connection between the non-orthogonal coupler and the lead screw aids in the separation of the transferring article and the pushing article behind it, and ushers the article into transferring to the container. A sensor, which can be part of the pick trolley, detects, counts and records each successful article transfer into the container. After each transfer of an article, the container can be repositioned to place the pre-assigned space that will be occupied by the next article inside the container. Once the requested number of articles has been successfully transferred into the container, the coupler's motor may be stopped. Then, the coupler's motor rotation may be reversed. The reversal of the motor's rotation des-engages the non-orthogonal coupler from the lead screw. The non-orthogonal couple continues to retract clearing the shelf. At this time, another sensor also part of the pick trolley and which can be mounted in line with the non-orthogonal coupler, measures and calculates the amount of articles left on the transfer channel clip and verifies the results with the controller software. The pick trolley is now ready to go to the next picking location.

In addition to helping perform quality control, the pick trolleys camera can also be used to continuously grab frames of each article it passes by when traveling along the rack shelving and validating that the correct product is located where the control software has directed and that no human error has been introduced by placing the incorrect article in a transfer channel clip. The track infrastructure 128 as well as the clip trolleys 317 and the pick trolleys 318 are designed to, and may, work inside refrigerated (cooled and freezer) distribution centers. During order assembly, clip trolleys 317 and pick trolleys 318 typically ride along the track infrastructure 128 in the same direction. When a trolley reaches the end of the aisle, it proceeds in one of several alternative ways according to the progress of the task at hand as directed by the control software. For example, if the container is full, the trolley releases the container to shipping and proceeds to be ferried, by the turning turret 316 located at the end of the aisle, to the opposite side of the rack shelving where it receives another order assembly request and starts a new order assembling cycle. However, if the container is not full, the trolley is ferried by the turning turret 316 located at the end of the aisle, to the opposite side of the rack shelving where it continues assembling the order. If the articles that remain to be picked to complete the assembly of the order at hand are located in other levels or in other rack shelving, the trolley will make use of the network of turning turrets 316 to navigate from rack to rack throughout the distribution center until it finally comes to the desired article's pick location.

Figure 6:
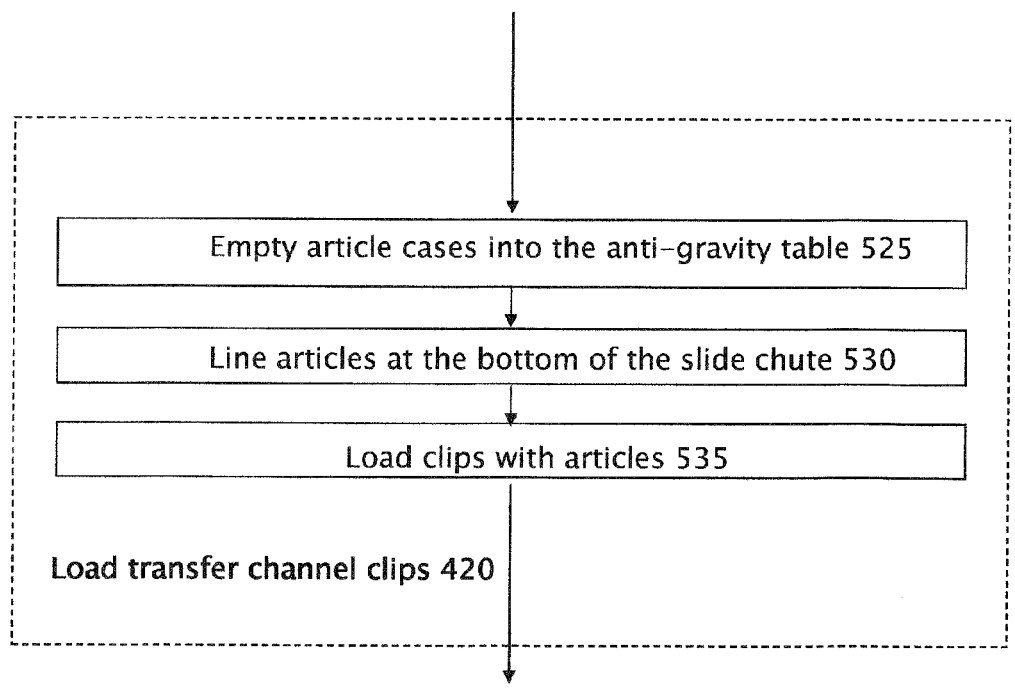
FIG. 6 highlights the process of loading the transfer channel clip.

FIG. 6 highlights the process of loading the transfer channel clip (420 of FIG. 5). This process may typically occur after order processing (215 of FIG. 5). The purpose of this process is to speed up the bringing down of articles from bulk storage and the loading of the articles into the transfer channel clips in an efficient manner that may free the personnel from having to read, scan or otherwise having to handle the articles for purposes of identification or differentiation. To load transfer channel clips, bulk packaged articles, generally packaged in pallets or cases, are brought down from bulk storage and may be transferred via conveyer or any other suitable manner of moving material in the distribution center, to the center of the anti-gravity tables Operators, then break the bulk packages and empty the contents of the bulk package in the center of the anti-gravity table 525. The anti-gravity table vibrates making the articles slide down to the bottom of the sliding chutes. As articles reach the end of the slide chute 530, operators line them up, and open trap doors that release the articles directly into the transfer channel clips 535.

Figure 7:
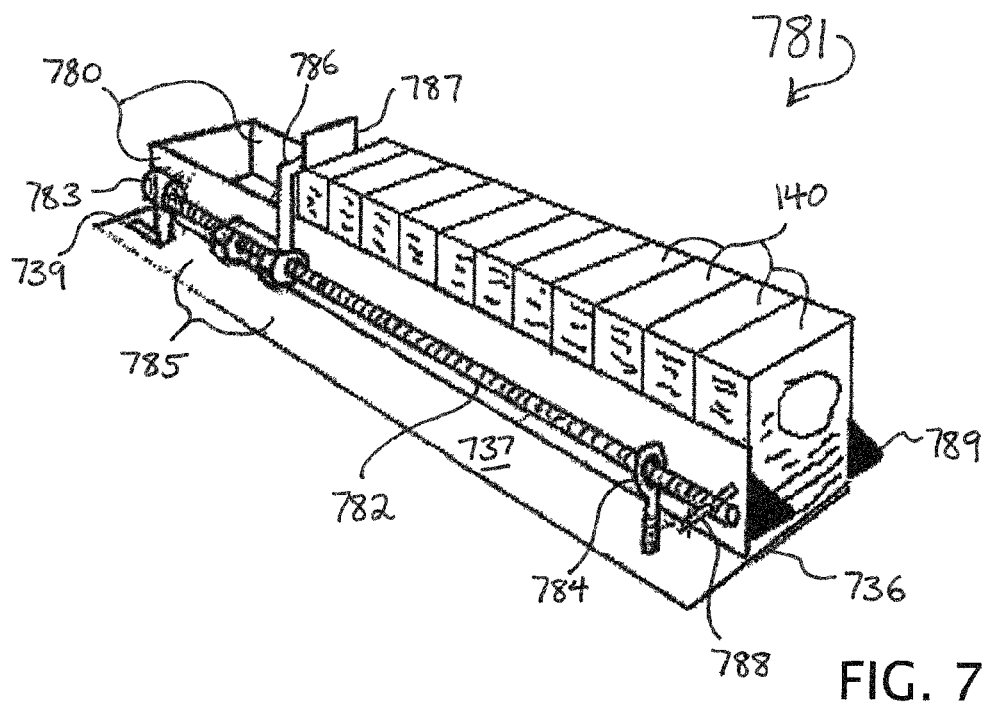
FIG. 7 shows a transfer channel clip.

FIG. 7 shows a transfer channel clip 781. The transfer channel clip 781 is made up of a substantially flat flooring surface 737, two substantially parallel and substantially straight walls 780, and one orthogonal end wall 779, located near optional edge 739. The flooring surface 737 and the parallel walls 780 form a U-channel. The U-channel walls 780 serve as guide rails, and are attached to the flooring by snaps, brackets, studs, screws, or their equivalent. The U-channel is substantially orthogonal to the planar flooring surface 737. The distance between guide rails 780 can be adjustable to accommodate articles 140 between them. The U-channel forms transfer channel clip 781. Transfer channel clip 781 meets, and is substantially orthogonal to transferring edge 736. The distance separating the U-channel walls 780 should be slightly greater than the width of articles 140, which will travel along the U-channel. In addition, the height of the guide railings 780 should be adjustable to ensure that the articles do not fall out of the transfer channel clip 781 as the planar shelf surface they may be placed on is tilted. Each of the ends of the guide railings 780 that are closest to transferring edge 736 may be elongated 789 beyond transferring edge 736. The purpose of these elongations 789 is to prevent the transferring article 140 from developing a yaw, to the right or to the left when the article 140 is in free fall. The guide railings 780 may be substantially rigid and generally made of metal, wood, plastic or other suitable material.

To one side and substantially parallel to the transfer channel clip 781, is a lead screw assembly 782 attached to the transfer channel clip's 781 flooring 737, by a conventional end bearing 783 located opposite to transferring edge 736, and a conventional loop-stud 784, located nearest to transferring edge 736. A conventional Lead screw 782, which may be metallic and can be threaded according to ACME standards, re-circulating ball screw thread patterns and the like. The Lead screw may be fitted with a load-carrying nut-system 785. Attached to the load-carrying nut 785, by a generally metallic arm 786, is a push-up surface 787 which is substantially orthogonal to the planar shelf surface 135 and which pushes articles 140 towards transferring edge 736. Push-up surface 787 is generally rigid and metallic but can be made of other materials such as wood or plastic or the like. The end of the lead screw 782 closest to the transferring edge 736 may be fitted with a rigid "T" ending 788 or an equivalent engaging structure.

Figure 8:
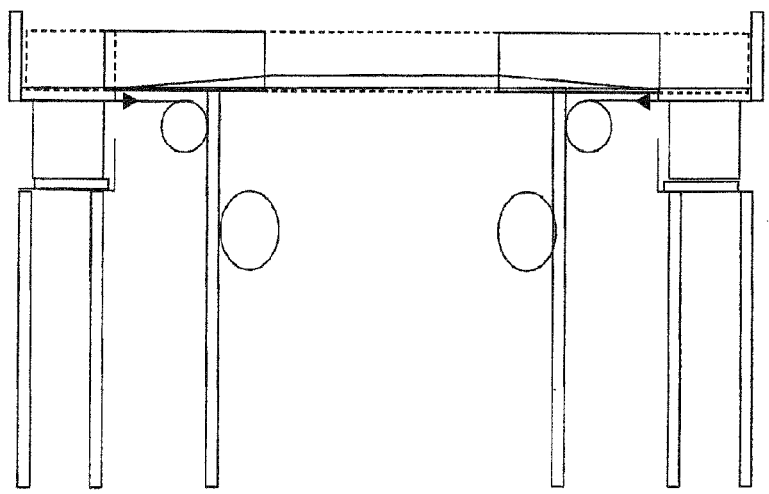
FIG. 8 shows the anti-gravity table.

FIG. 8 shows the anti-gravity table 306. The anti-gravity table tends to lighten objects by vibrating them. The anti-gravity table 306 is a specially designed piece of equipment that loads the transfer channel clips 781 with articles 140 which may be sent to the order assembly area to be picked, packed and shipped. The anti-gravity table 306 consists of a circular center 811 and radial slide chutes 307 which may be slightly slanted downwards as the distance increases from the anti-gravity tables' 306 center. The radial slide chutes 307 may be walled 813 and 814 on all sides to prevent articles (140 of FIG. 7) from falling off. The anti-gravity table 306 may be fitted with first motor 801, second motor 803 and solenoid 805. First motor 801 is used to create vibrations along the horizontal direction while second motor 803 causes alternating vibrations in the vertical direction. Alternatively, other vibration methods may be used such as pneumatic or the like. The radial chutes' 307 end walls 814 which may be perpendicular to the radius of a concentric circle centered at the anti-gravity table's 306 center, and thus, form tangential walls 814. The radial slide chutes' 307 end flooring 812, is fitted with trap doors 815 which may be located next to the tangential walls 814. Underneath the anti-gravity table 306 may be a conveyor system 820 that delivers and places transfer channel clips 781 bellow each trap door 815. The anti-gravity table 306 rests on top of legs 822. The anti-gravity table 306 and its elements are generally made of metal, low friction plastic, resin covered wood or any other equivalent material.

Figure 9:
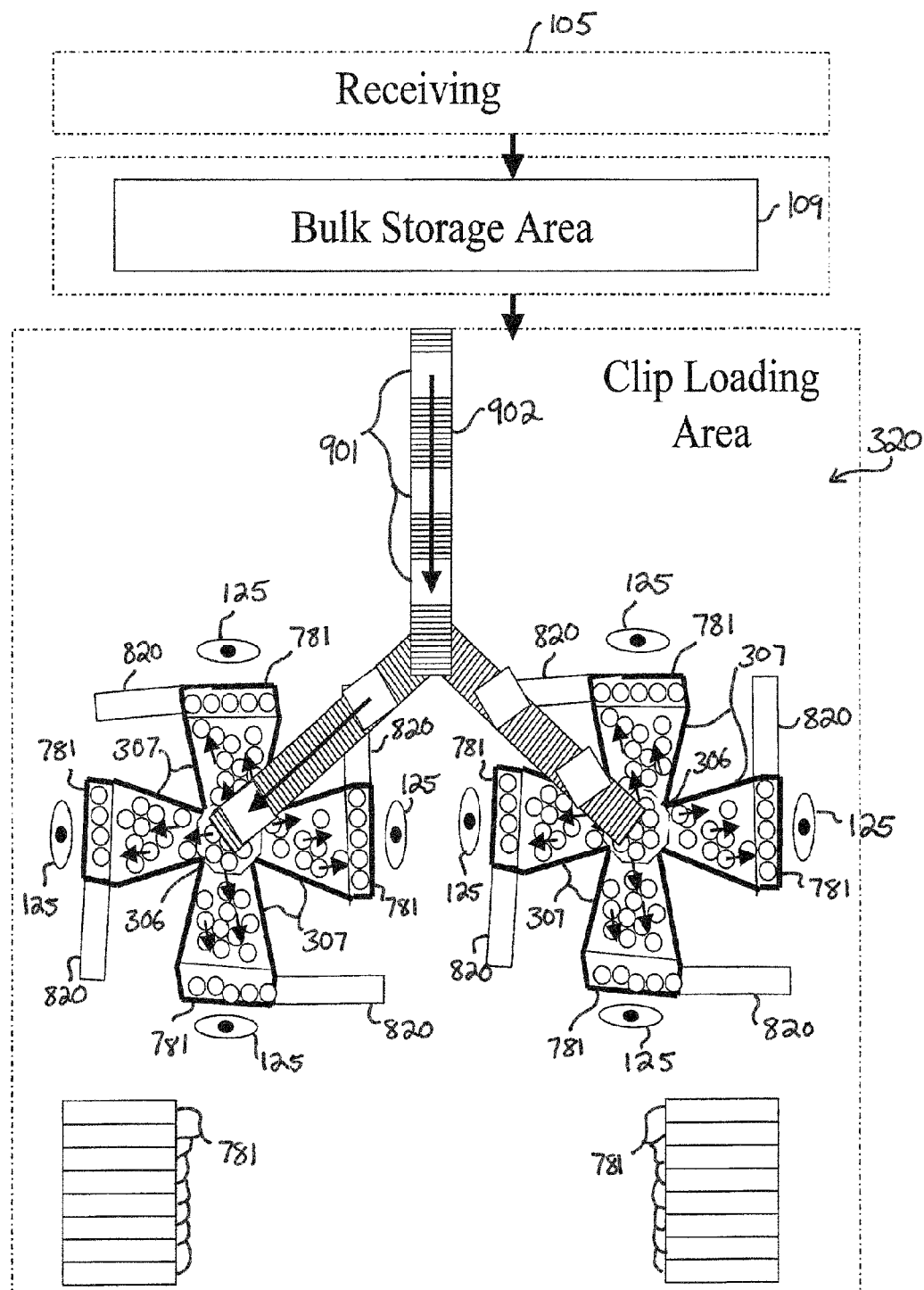
FIG. 9 shows how the product may be brought down from bulk storage to the clip loading area in the clip loading process.

FIG. 9 shows how that in the clip loading process the cased product 901 may be brought down from bulk storage 109 to the clip loading area 320. The transfer channel clips 781 may be loaded with articles through one or more sub-process. During this process, the articles are loaded into transfer channel clips 781 which in turn are placed in the rack shelving (not shown) to ready the articles for order assembly. Next, clip trolleys (not shown) may take article-laden transfer channel clips 781 to the order assembly area. The purpose of the transfer channel clip loading area 320 is to replenish the inventory in the rack shelves in a typically speedy and efficient manner.

The present illustration is a top view depicting the transfer channel clip 781 loading process. Product cases 901 arrive from bulk storage 109 area via conveyor 902. Conveyor 820 brings empty transfer channel clips 781 and places them under the anti gravity table's 306 slide chutes 307. The cases' contents can be emptied into the center of each anti-gravity table 306 by an operator 125. At this point, the center of the anti-gravity table 306 distributes articles to one or more slide-chute(s) 307. The articles then slide down the slide chute 307 aided by the vibration generated by the anti-gravity table 306. The articles group together at the bottom of the slide-chute 812. Next, an operator may line up the articles in a straight line and against the peripheral wall 814 closest to the operator 125. Once the articles are lined up, the operator 125 activates a mechanism (not shown) that slides the flooring 815 away from the lined up articles 140. The articles 140 then fall simultaneously into the transfer channel clip 781. Alternately, the articles may slide into the transfer channel clip. After this, the clip trolleys may take the filled transfer channel clips 781 to the rack shelving to replenish the planar shelf surface. The process repeats for each different set of articles 140.

Figure 10:
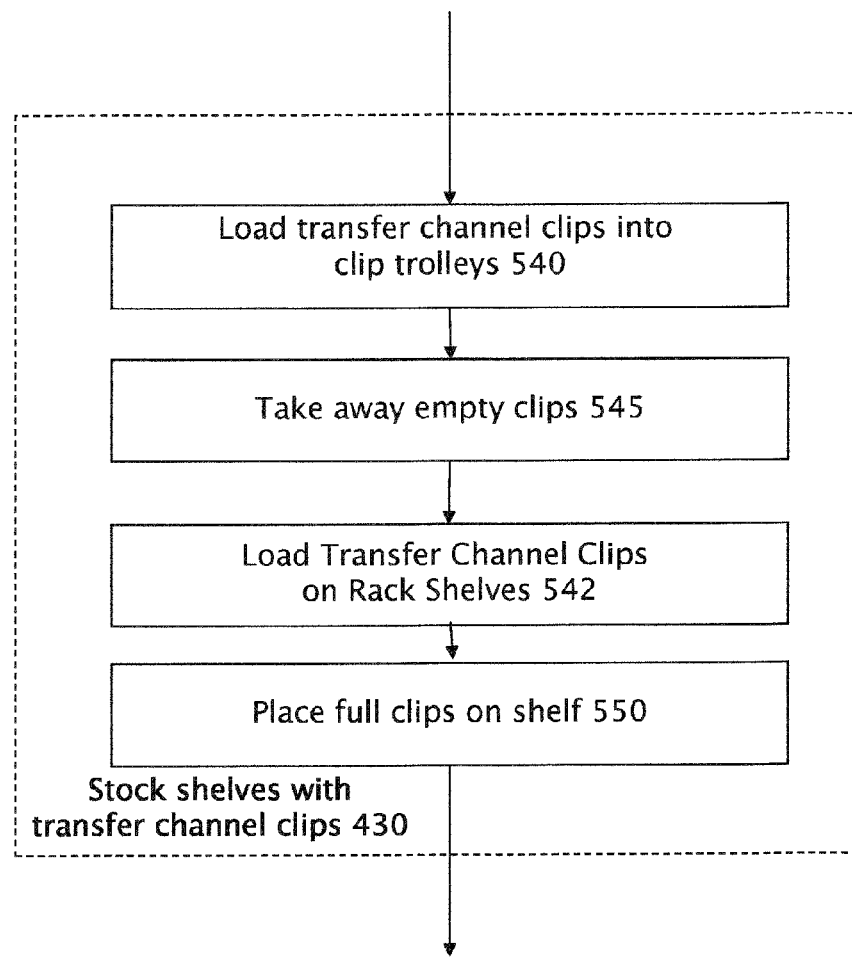
FIG. 10 is a flow chart where the process of stocking the rack shelves with transfer channel clips (430 of FIG. 5) is highlighted.

FIG. 10 is a flow chart where the process of stocking the rack shelves with transfer channel clips (430 of FIG. 5) is highlighted. To do this, the laden transfer channel clips are loaded into the clip trolleys 540. The clip trolleys then enter the dual use track railing attached to the rack shelving, and proceed to deposit the loaded transfer channel clips on the order assembly area rack shelves 542. To do this, the clip trolleys first arrive to a pre-determined location and if there is an empty transfer channel clip, the empty clip is removed 545 by the clip trolley and a full transfer channel clip is set in its place. The newly loaded transfer channel location is then validated, via wireless communication, between the clip trolley and the controller software. The stocking of rack shelves process can take place at the same time that order assembly process is taking place. This constitutes a useful feature because it allows for dynamically changing an article's location to make it more easily accessible to a picking trolley for faster order assembly. In addition, this dynamic process allows for simultaneously picking and replenishing the order assembly area doing away with the need to stop one process to carry out the other.

Figure 11:
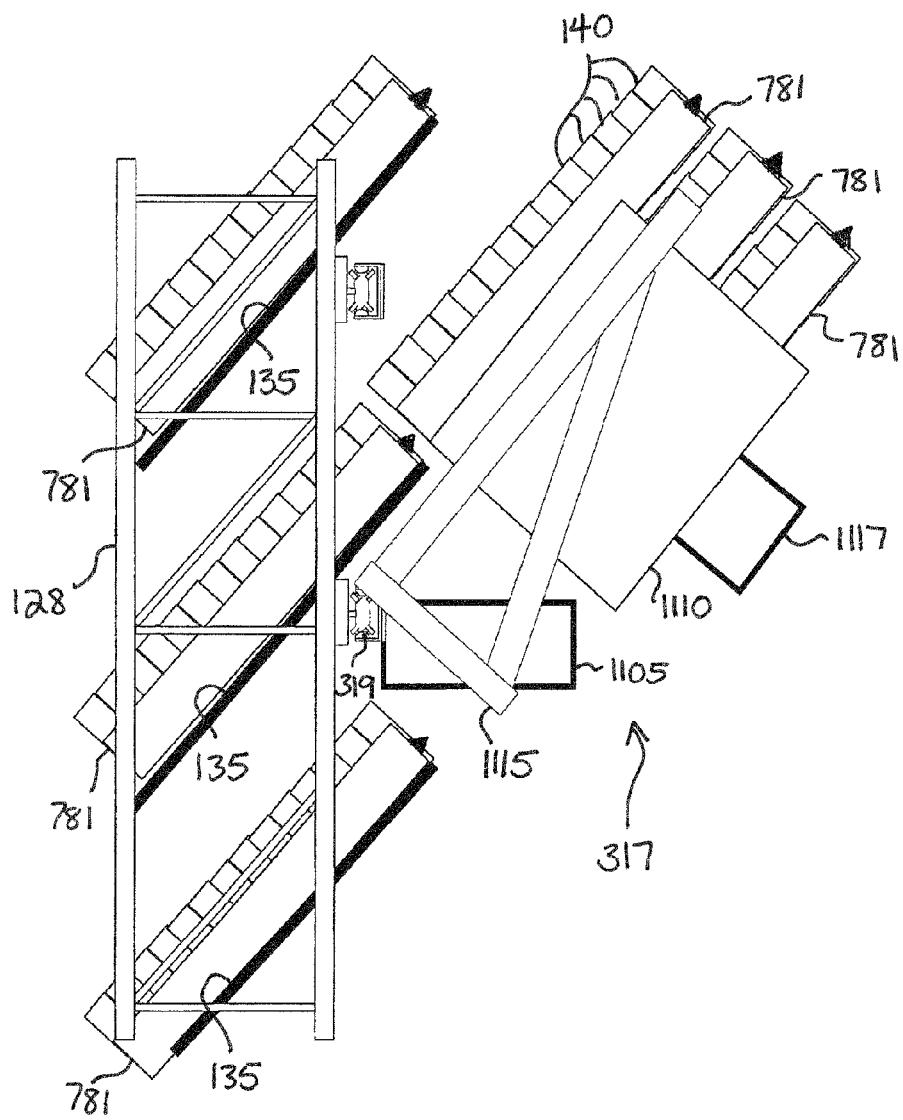
FIG. 11 shows the clip trolley, which runs along the rack shelving track to place loaded transfer channel clips on the planar shelf surface.

FIG. 11 Shows the clip trolley 317, which runs along the rack shelving 128 on a track 319 to place loaded transfer channel clips 781 on the planar shelf surface 135. The clip trolley 317 includes a motor 1105, which translates the trolley on track 319, a frame structure 1115 that supports a tray 1110 where the loaded and empty transfer channel clips are transported. Motor 1117 raise the tray's 1110 flooring to deposit the loaded transfer channel clips 781 on to the planar shelf surface 135. The replenishing process places articles 140 onto the planar shelf surface 135 to make the articles 140 available for picking and packing by the pick trolleys. In addition, clip trolleys 317 run concurrently, sharing the same slide rail infrastructure 319 with the pick trolleys, to replace depleted transfer channel clips 781, in just-in-time fashion ("JIT").

Figure 12:
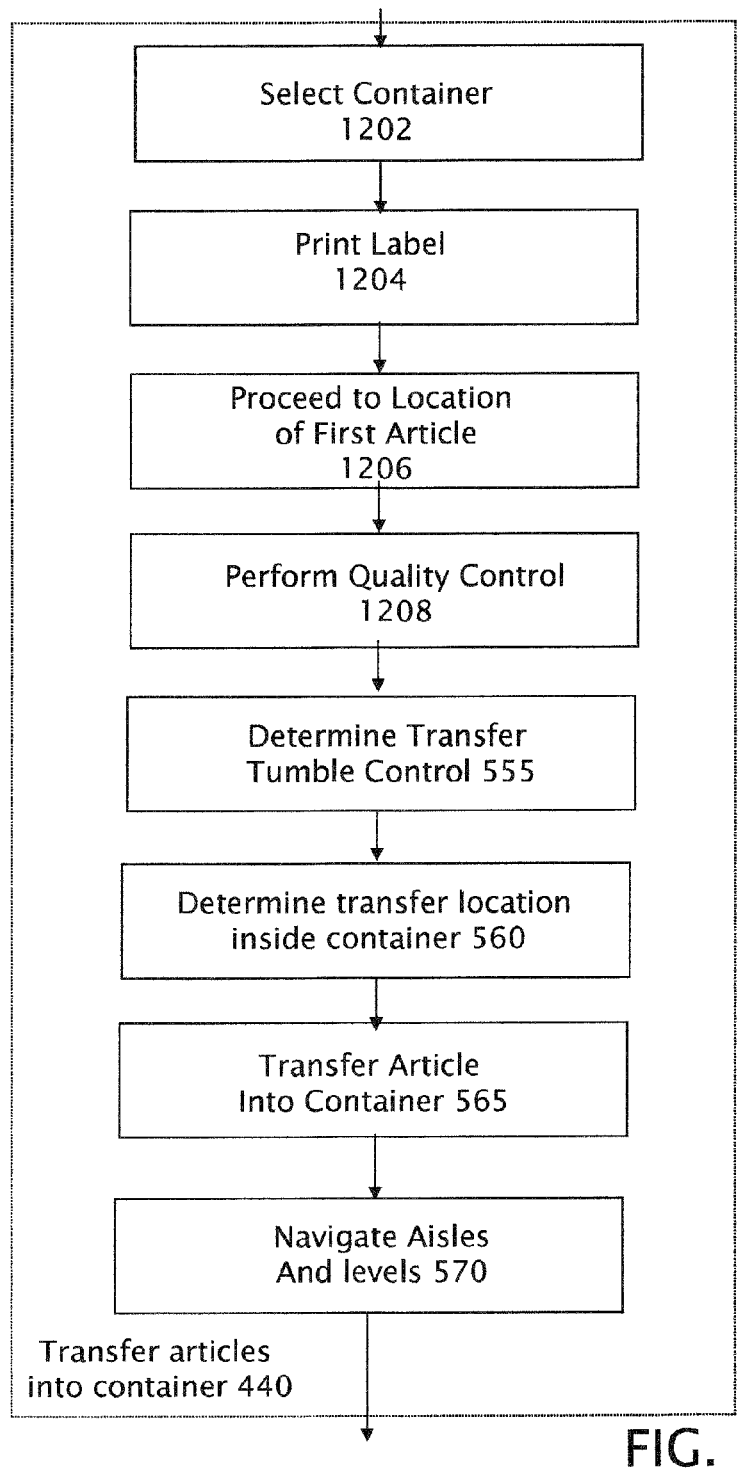
FIG. 12 shows how the process of transferring articles from the shelf into the container (440 of FIG. 5) begins by determining the desired amount of tumble control for each article.

FIG. 12 shows the process of transferring articles from the shelf into the container (440 of FIG. 5). In transferring articles from the shelf into the container, the pick trolley selects and loads the appropriate size container, places a shipping label onto the container and proceeds to the location of the first article to be transferred 1202. Once it reached the desired location, it may perform pre-emptive quality control by capturing an image of the article to be picked 1204. The pick trolley compares the captured image to the one passed to it along with the order request and verifies that the article on the shelf is in fact the requested article 1206.

The process next determines the desired amount of tumble control 555 for each article. Once the optimal transfer angle has been determined, the controller software determines the transfer location of each article inside the container 560. This is done by moving the container towards or away, and to the right or left, with respect to the transfer channel location. Then, the next process is to transfer the article from the shelf into the container 565. The pick trolley then powers the non-orthogonal coupler's motor. The non-orthogonal coupler advances and reaches over to the shelf and engages transfer channel's the lead screw. Power is continually applied causing the lead screw to turn and push the articles in the transfer channel towards the transferring edge. The article that is closest to the transferring edge begins to come out of the transfer channel clip, eventually falling out of the transfer channel clip and into the pre-assigned space inside the container. A vibration, produced by the non-orthogonal connection between the non-orthogonal coupler and the lead screw aids in the separation of the transferring article and the pushing article behind it, and ushers the article into transferring to the container. A sensor, which is part of the pick trolley, detects, counts and records each successful article transfer into the container. After each transfer of an article, the container is repositioned to place the pre-assigned space that will be occupied by the next article inside the container. Once the requested number of articles have been successfully transferred into the container, the coupler's motor is stopped.

Then, the coupler's motor rotation is reversed. The reversal of the motor's rotation dis-engages the non-orthogonal coupler from the lead screw. The non-orthogonal couple continues to retract clearing the shelf. At this time, another sensor also part of the pick trolley and which is mounted in line with the non-orthogonal coupler, measures and calculates the amount of articles left on the transfer channel clip and verifies the results with the controller software. The pick trolley is now ready to go to the next picking location. After transferring items from one picking location, the pick trolley advances to the next location. When the end of the rack shelving structure is reached, pick and clip trolleys make use of the turning turrets to navigate along the order assembly area 570.

FIG. 13 shows the pick trolley 318 of the controlled transfer and packing facility that may be used to load items from shelves into shipping boxes. The controlled transfer and packing facility is comprised of a typical commercially available warehouse shelving rack 128 which includes a typical commercially available warehousing rack frame structure having typical commercially available rack shelving upright frames 1331, connected by typical commercially available rack shelving spanner beams 1332 and 1333. Securely attached, by screws, to spanner beams 1332 and 1333 is a planar shelf surface 135. The planar shelf surface 135 generally made of wood, metal or polymer or any other suitable material carries a plurality of transfer channel clips 781, which in turn, carry a plurality of articles 140, ready to be picked. Examples of articles that may be on the shelf ready for picking, packing and shipping are: soda bottles, soup cans, shoe boxes, engine blocks, bags of rice, sugar or other staples, boxes of tools, cases of wine, cases of pet food and so on. As illustrated in this figure, spanner beams 1332 and 1333 are attached to the upright frames 1331 in staggered fashion so that the planar surface 135 attached to them is tilted, forming an angle from a substantially level plane.

The side length 1337 of the planar surface 135 may be sufficiently long to create a cantilever overhang 1338 from spanner beam 1333. Not all forms of the present example include or require the cantilever overhang 1338. However, it is included for illustrating purposes.

Included in this figure are also a pick trolley 318, which carries a non-co-axial coupler 1370 as well as a place for container 150 (not shown), where articles 140 are transferred into. Pick trolley 318 can be fabricated out of wood, polymer, steel, iron, aluminum, titanium or any alloy which makes it lightweight while being rigid and having sufficient load bearing capacity.

Referring back to the present illustration, it is shown that pick trolley 318 slides along C-channel 1355 powered by motor 1360. Attached to pick trolley 318 by screws, welding or any other equivalent methods are platforms 1361 and 1362. These platforms 1361 and 1362 ride on telescopic arm 1375 (in the upward direction), and telescopic arm 1376 in the side-to-side direction. Platforms 1361 and 1361 carry a container or tote, where articles 140 are transferred into. Pick trolley 318 also carries a non-co-axial coupler 1370, which is powered by motor 1364. Motor 1364 can be electrically, hydraulically, and pneumatically or powered by any other means known in the art. Pick trolley 318 carries computer enclosure 1368, which includes a processor (not shown) and pertinent electronic circuitry (not shown) to wirelessly communicate with a main controller computer (not shown), which manages all motion functions mentioned above.

FIG. 14 and FIG. 15 show a C-channel rail 1355, which serves as guide to pick trolley and clip trolley. Securely connected by screws to spanner beam 1333 is a C-channel rail 1355, which serves as guide to pick trolley 318. The C-channel rail 1355 is made out of iron, steel or any other suitable material and is commercially available from a plurality of fabricators. Bellow C-channel 1355 and also secured by screws to spanner beam 1333 is a conductor bar 1457, which delivers electric power, by means of conductors 1454, over the length of the C-channel 1355 to a plurality of power sources 1360, 1363 and 1364, which form part of pick trolley 318. Conductor 1457 also delivers power to linear actuators (not shown), motor drives (not shown) and computer circuitry (not shown) enclosed in computer enclosure 1368, which form part of pick trolley 318. Conductor bar 1457 can be sourced from numerous enclosed conductor system manufactures. However, for the example presently described, conductor bar 1457 is constructed out of fiberglass with aluminum conductor bars. Other materials suitable for the construction of conductor bar 1457 are polymers, plastics, ceramics and/or other electrically conductive and non-conducting materials. Further, bellow conductor bar 1457 and also secured by screws to spanner beam 1333 is, for purposes of this example, a cogged rack 1458 component of a rack and pinion system which is used as the propulsion system to translate pick trolley 318 along C-channel 1355. Alternatively, other equivalent propulsion systems may be used. The rack and pinion system is conventionally constructed. Inside the C-channel 1355 runs a slide 1551 which includes roller bearings 1552 and looped studs 1553. Pick trolley 318 attaches to the slide's 1551 looped studs 1560.

Figure 16:
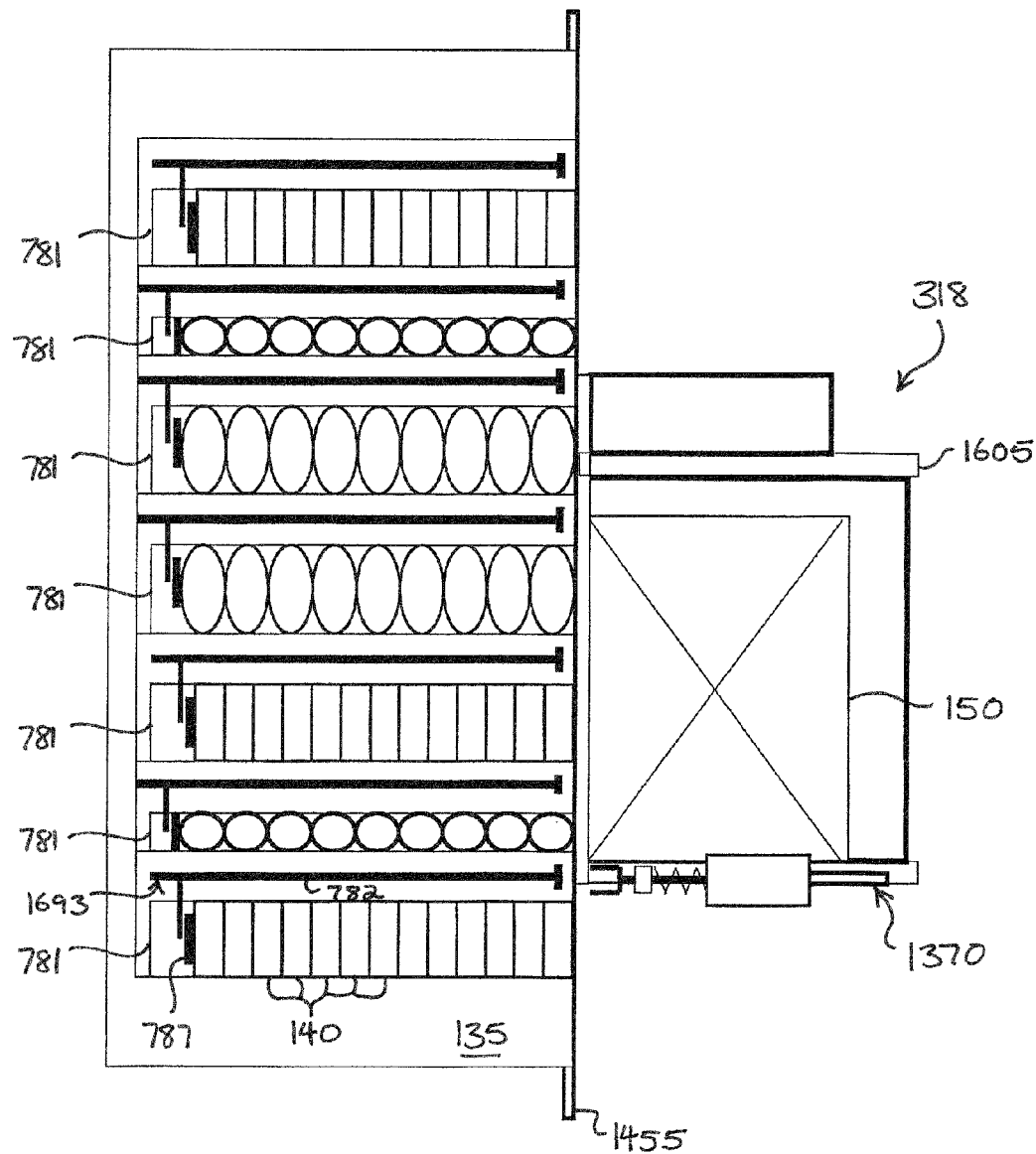
FIG. 16 in a top view showing how the different components individual in the pick trolley interact with the transfer channel clip and the article feeding mechanism to perform an article transfer operation in loading a shipping box.

FIG. 16 is a top view showing how the different components included in the pick trolley 318 interact with the transfer channel clip 781 and the article feeding mechanism 1693 to perform an article 140 transfer operation in loading a shipping box. The pick trolley 318 is seen on the lower right hand side of this illustration. The pick trolley 318, consisting of its frame 1605, a container 150, the non-orthogonal coupler 1370, sensors (not shown), connectors (not shown) and several motors (not shown). The pick trolley 318 slides along c-channel track 1455 and stops in front of the article 140 to be picked. Once the pick trolley 318 has stopped, the container 150 is positioned in the X and Y directions to be directly under the article 140 to be transferred. Next, the non-orthogonal coupler 1370 is powered to reach over to the planar shelf surface 135 and engage the transferring mechanism 1693 to cause one or more articles 140 to transfer into the container 150. On the right hand sides of the present illustration are: the planar shelf surface 135, a plurality of transfer channel clips 781, containing different articles 140. Also, a lead screws 782 and the push up surfaces 787.

Figure 17:
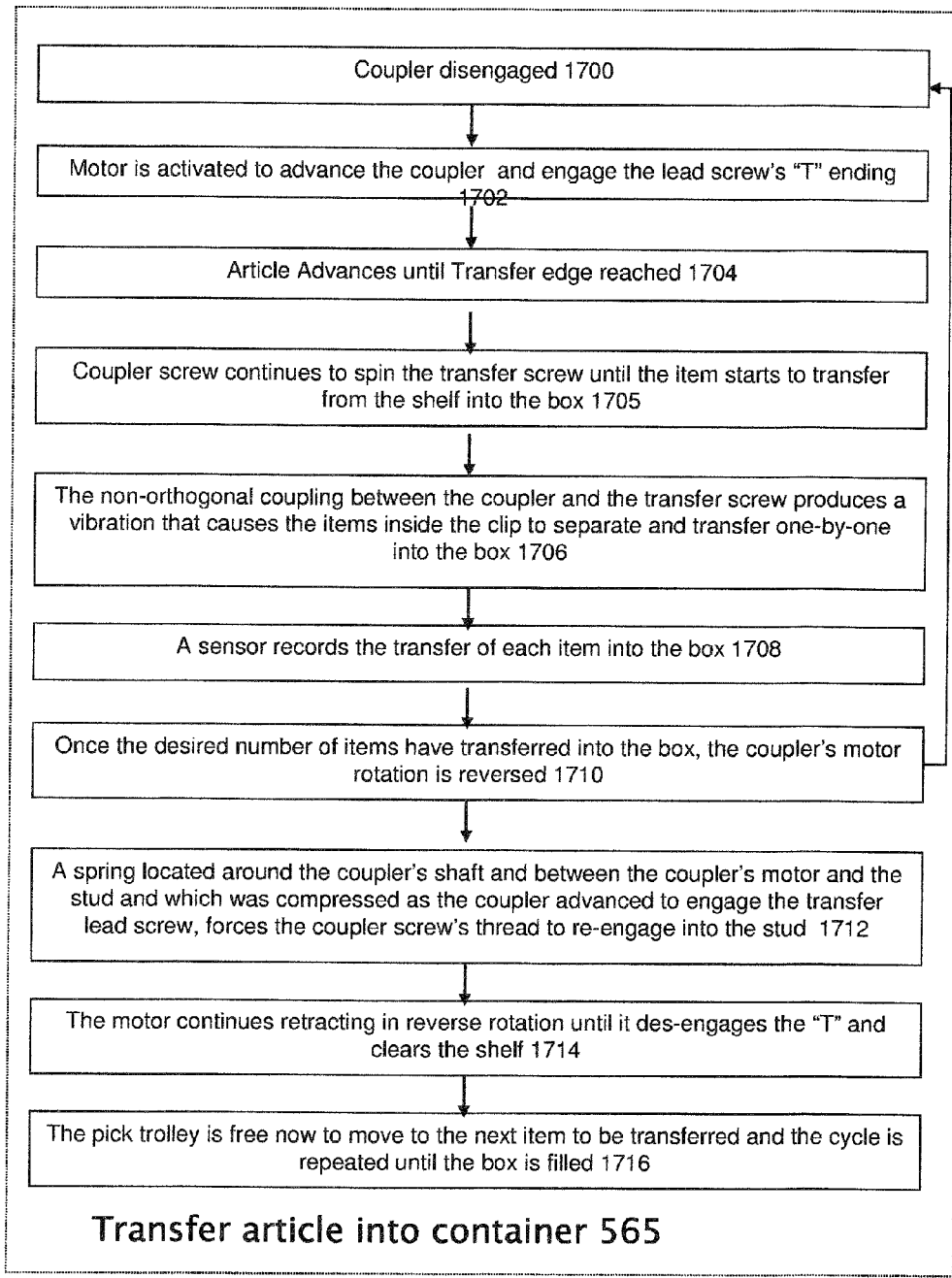
FIG. 17 is a flow chart of the process of transferring articles into a container (565 of FIG. 15).

FIG. 17 is a flow chart of the process of transferring articles into a container (565 of FIG. 5). The coupler motor is disengaged 1700. The pick trolley then powers the non-orthogonal coupler's motor. The non-orthogonal coupler advances and reaches over to the shelf and engages transfer channel's the lead screw 1702. Power is continually applied causing the lead screw to turn and push the articles in the transfer channel towards the transferring edge 1704. The article that is closest to the transferring edge begins to come out of the transfer channel clip, eventually falling out of the transfer channel clip and into the pre-assigned space inside the container 1705. Vibration, produced by the non-orthogonal connection between the non-orthogonal coupler and the lead screw aids in the separation of the transferring article and the pushing article behind it, and ushers the article into transferring to the container 1706. A sensor, which is part of the pick trolley, detects, counts and records each successful article transfer into the container 1708. After each transfer of an article, the container is repositioned to place the pre-assigned space that will be occupied by the next article inside the container. Once the requested number of articles have been successfully transferred into the container, the coupler's motor is stopped. Then, the coupler's motor rotation is reversed 1710. The reversal of the motor's rotation disengages the non-orthogonal coupler from the lead screw. The non-orthogonal couple continues to retract clearing the shelf. At this time, another sensor also part of the pick trolley and which is mounted in line with the non-orthogonal coupler, measures and calculates the amount of articles left on the transfer channel clip and verifies the results with the controller software. The pick trolley is now ready to go to the next picking location. A spring located around the coupler shaft in between the coupler's motor and the stud and which was compressed as the coupler advanced to engage the transfer lead screw, forces the coupler screw thread to re-engage into the stud 1712. Then the motor continues retracting in reverse rotation until is disengages the "T" and clears the shelf 1714. Then the pick trolley is free to move to the next item to be transferred and the cycle is repeated until the box is filled 1716.

Figure 18:
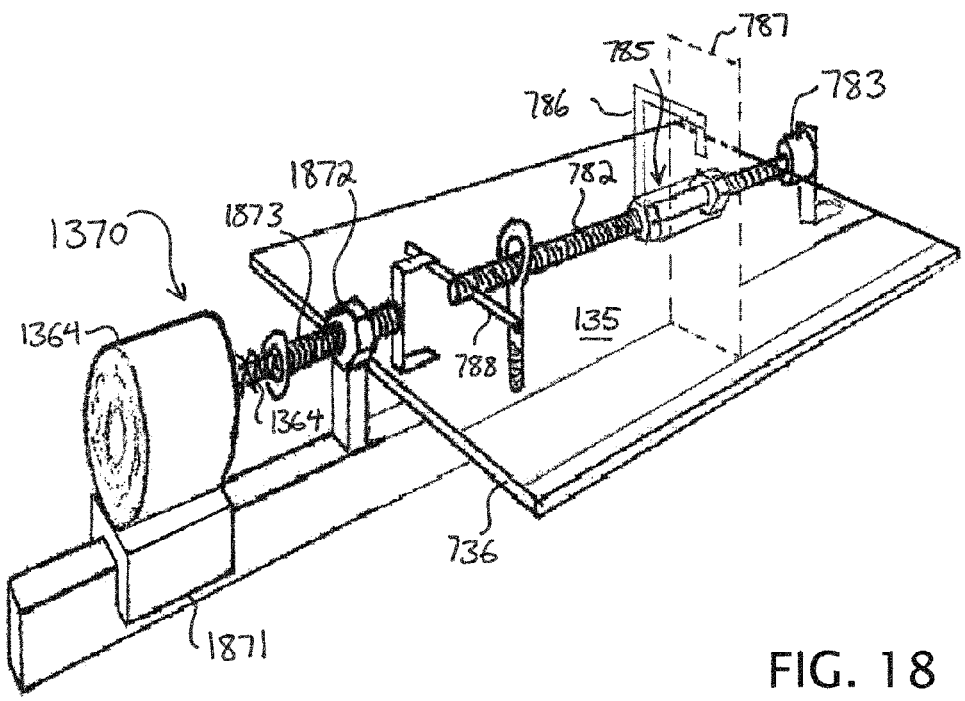
FIG. 18 shows in further detail the non-co-axial coupler that mechanically couples the pick trolley to the transfer channel clip to cause items to tumble from the shelves to a box on the pick trolley.

FIG. 18 shows in further detail the non-co-axial coupler that mechanically couples the pick trolley to the transfer channel clip to cause items to tumble from the shelves to a box on the pick trolley. The non-co-axial coupler 1370, consisting of a sliding base 1871, which is attached by screws, welding or any other means known in the art to pick trolley 318. Sliding base 1871 slides by means of a plurality of commercially available re-circulating ball bearing linear or control motion slide systems. Sliding base 1871 is substantially flat and supports, by means of a bracket or any other means known in the art, motor 1364. Attached to frame 318 and located in front of the metallic sliding base 1871 is a stud and nut combination 1872. Engaging screw 1873, which is an extension of power source's 1364 axle, threads in both directions, through the stud and nut combination 1872, according to the direction that motor 1364 turns. The threaded portion of engaging screw 1873 begins at the "U" ending and continues to a distance determined by the advancing length required to fully engage the lead screw's 782 "T" ending 788. After the engaging screw's 1873 threaded portion ends, the engaging screw's 1873 are devoid of threads and thus its diameter is reduced to substantially the internal diameter of the engaging screws 1873. When engaging screw 1873 to advance through the stud and nut combination 1872, it compresses spring 1865 until it reaches the end of the threads. When the engaging screw 1873 reaches the end of the threads, it stops advancing even as motor 1364 continue to rotate. To transfer an article 140 into container 150, power is applied to motor 1364 which rotates and causes the non-co-axial coupler 1370 to advance in the manner just described until the "U" engaging fork having ends 1873*a* and 1873*b* meets and engages the lead screw's 782 "T" ending 788. As lead screw 782 turns, articles 140 are pushed towards the transferring edge 736 and into a container 150.

The current figure is also an exploded view of the power transfer mechanism and includes detailed aspects of the non-orthogonal coupler 1370, the thread re-engaging spring 1865, the motor 1364, the lead screw 782, the "T"-ending 788, the load-carrying nut-system 785, the push-up surface 787 and the planar shelf surface 135. Pick trolley 318, carries at least a container 150 and the non-co-axial coupler 1370 and travels to the location of an article 140 which is to be transferred into container 150. To cause the article 140 to transfer from the shelf 135 into the container 150, the software stops pick trolley 318 at the point where the axial line of the "U" engaging fork 1873 is in front and nearly orthogonal to the axial line of lead screw 782. The software then causes motor 1364 to turn in the appropriate direction. As the "U" engaging fork 1873 turns, it threads through the nut, which is part of the stud and nut 1872 assembly. Since the stud and nut 1872 are fixed to the pick trolley 318, the non-co-axial coupler 1370 advances, riding on the sliding base 1871, towards lead screw 782. The "U" engaging fork 1873 engages the lead screw's 782 "T" ending 788. As the "U" engaging fork 1873 engages the lead screw's "T" ending 788, the lead screw 782 begins to turn and articles 140 are pushed towards the transferring edge 736 of the planar shelf surface 135. When the end of the threads of the "U" engaging fork 1873 is reached, the non-co-axial coupler 1370 ceases to advance. However, as motor 1464 continue to turn, articles 140 continue to be pushed towards the transferring edge 736 until the article 140 closest to the edge transfers into the container 150. As the article 140 transfers into the container 150, one or more sensors (not shown) detect the transfer and cause the software to stop motor 1364. If a second article 140 from the present location is to be transferred into container 150, the software repositions container 150 by turning on and off power sources 1362 and/or 1363 (not shown) until an empty location is under the article. Motor 1364 is caused to turn again repeating the transferring cycle. When all the articles 140 that were desired to be transferred from the present location have been transferred into container 150, the software reverses the rotation of motor 1364. Spring 1865, which has been compressed between motor 1364 and the stud and nut 1872, forces the "U" engaging fork's 1873 to re-thread itself through the nut component of the stud and nut 1872 thereby retracting the non-co-axial coupler 1370 and dis-engaging the "U" engaging fork 1873 from the lead screw 782. At this point, pick trolley 318 is ready to advance along to the next transfer (pick-up) location or to the end of the run where the loaded container 150 is taken away.

Figure 19:
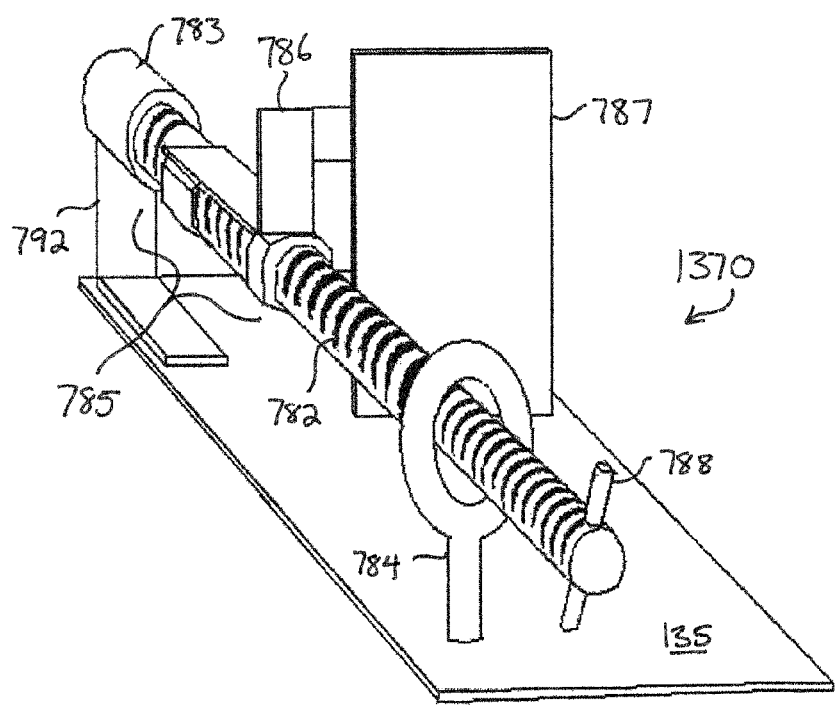
FIG. 19 shows that the article feeder consists of a lead screw, which is attached to the planar shelf surface.

FIG. 19 shows that the article feeder 1893 consists of a lead screw 782, which is attached to the planar shelf surface 135. It may be attached by screws, welds or any other equivalent methods, and is supported by an end-bearing 783 and a loop-stud 784. The end of the lead screw 782 closest to the transferring edge 736 is fitted with a "T" ending 788. The "T" ending 788 is usually made from a metallic stud, which is pressure-fitted into a hole previously drilled on lead screw 782. Lead screw 782 can be supported by numerous other means such as a flange bearing, a pillow block bearing or a take-up frame bearing. In the present example, the lead screw 782 is supported by a PVC pipe-end cap 783, which is attached by means of a loose screw and nut to an "L" bracket 792. The end "L" bracket 792 thereof is attached by means of screws, welding, or any other means known in the art, to planar shelf surface 135. In addition, lead screw's 782 ends closest to the "T" ending 788 can be supported by numerous other means such as "Y" studs, wood, polymer or metal plates with thru holes and stop clips, or any other means known in the art. Loop stud's 784 internal diameter is large enough for lead screw 782 to loosely fit through it. There is a dual purpose for the loop-stud's 784 oversized diameter. First, it allows the lead screw to maintain coupling even if there isn't a precise co-axial coupling between the lead screw 782 and the non-co-axial coupler 1370. Second, as articles 140 are placed one behind the other in a line and tilted at an angle, sometimes their weight makes them stick to each other and thus, not transfer expediently. In those instances, the larger diameter on the loop-stud 784 allows the lead screw 782 to swing from side to side and up and down as it turns, creating a desired vibrating effect which serves to loosen and separate a transferring article 140 from its neighbor behind it. The diameter of the PVC pipe-end cap 783 supporting the lead screw 782 is large enough for lead screw 782 to loosely fit inside it. In this manner, drag—due to friction is minimized, while sparing the expense and maintenance needs associated with end-bearings.

Figure 20:
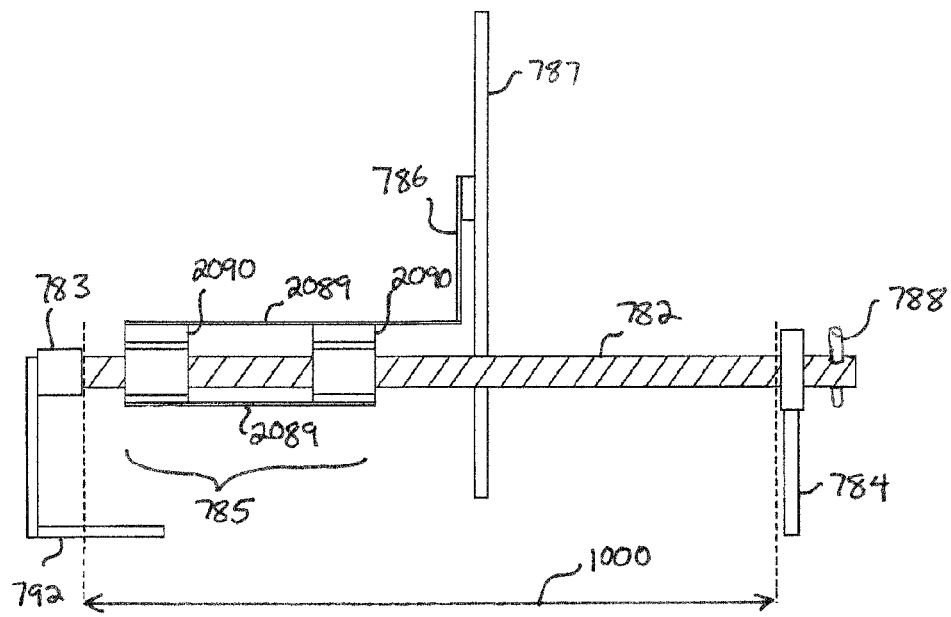
FIG. 20 illustrates the dual traveling-nut system of the article feeder.

FIG. 20 illustrates the dual traveling nut system of the article feeder. Two nuts 785 are connected to each other by connector 2089 and connector-arm 786 to form traveling-nut system 785. Traveling-nut system 785 travels along lead screw 782 and spans length 1000. The connections between connectors 786 and 2089 and the load carrying nuts 785 can be made out of welds, screws, clamps or any other means know in the art. Placed above each load carrying nut 785, are two height-adjustment blocks 2090, which allow arm 786 to clear the top of loop stud 784 and thus travel beyond loop-stud 784, towards transferring edge 736. Attached to the load-carrying nuts 785, by means of a generally metallic connecting arm 786, is a push-up surface 787, which is substantially orthogonal to the planar shelf surface 135 and which travels along transfer channel clip 781. As lead screw 782 turns, the load carrying nuts 785 advance towards transferring edge 736 and articles are pushed by push-up surface 787 along transfer channel clip 781, towards transferring edge 736 and eventually into the container 150.

Figure 21:
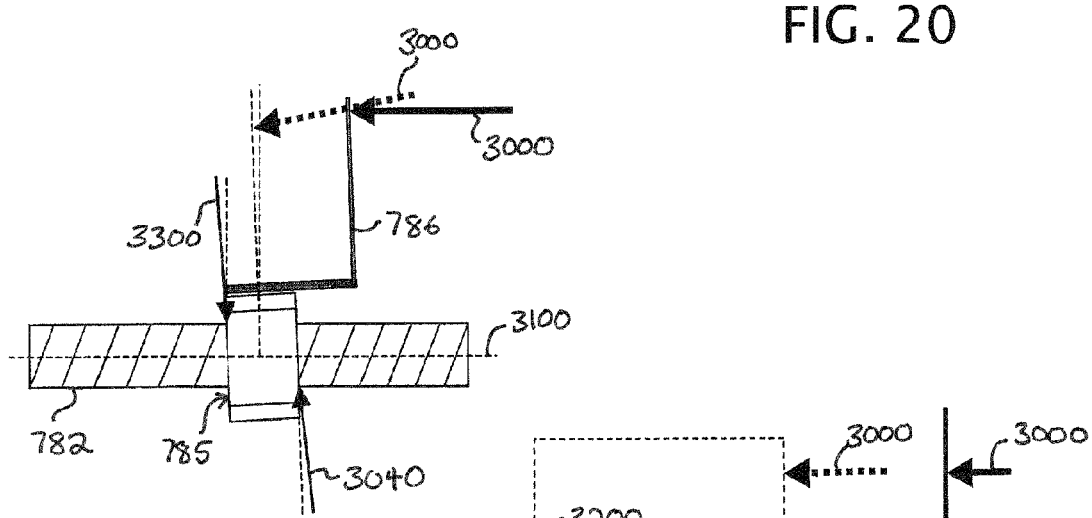
FIG. 21 shows that when non-coaxial forces are applied to a screw through a single nut, the nut and the screw tends to bind.

FIG. 21 shows that when non-coaxial forces 3000 are applied to a screw 782 through a single nut 785, the nut 782 and the screw 785 tends to bind. This may make it difficult for the nut 785 to thread along the screw 782 while the force 3000 is exerted. This is because the nut 785 does not travel co-axially with the screw's 782 center line 3100 and thus, the force's moment arm 3200 acting on the screw's 782 axis 3100 is non-orthogonal to the screw's 782 axis. This translates into binding because component vectors 3300 and 3400 concentrate their forces in a small contact area between the nut 785 and the screw 782 threads and do not spread evenly throughout all contact surfaces between the threads of the screw 782 and the nut 785. In order to minimize the binding problems associated with carrying a non-axial load on a nut which travels along a screw.

Figure 22:
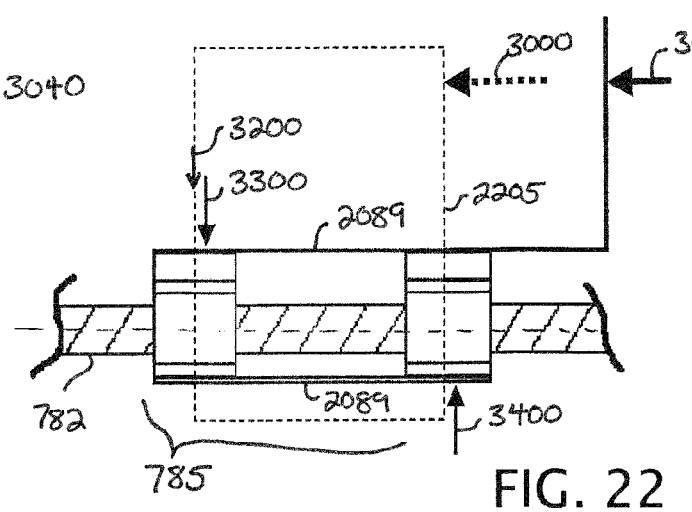
FIG. 22 illustrates how one or more substantially similar nuts are placed on the screw at a pre-calculated distance on either or both sides of the load carrying nut to prevent binding of the article feeder.

FIG. 22 illustrates how one or more substantially similar nuts 785 are placed on the screw 782 at a pre-calculated distance 13500 on either or both sides of the load carrying nut 785 tending to prevent binding of the articles feeder. These nuts 785 are then rigidly tied together by two or more connectors 2089. Flanges, screws, a cylinder or any other means known in the art, can be used to form a traveling-nut system 2205 that thread through lead screw 782 even though a force may be exerted through an arm 786. When force 3000 is applied through connecting arm 786, to the traveling-nut system 2205. The resultant force exerted upon the screw 782, is substantially spread to all thread areas of contact between the nuts 785 and the lead screw's 782.

The current figure also shows that since there are two (or more) nuts rigidly tied together forming the traveling-nut system 785, the "force per area" is reduced. In addition, when two or more nuts 785 are rigidly tied together, if a non axial force 3000 is applied, each nut's 785 tendency to rotate axially in relation to the screw's 782 center line 3100 is greatly minimized. Thus, each nut 785 keeps in-line with the screw's center line 3100 and the contact area between the screw 782 and the nut's 785 threads is maximized as well as bringing the load's moment arm 3200 substantially orthogonal to the screw's 782 center line 3100.

Figure 23:
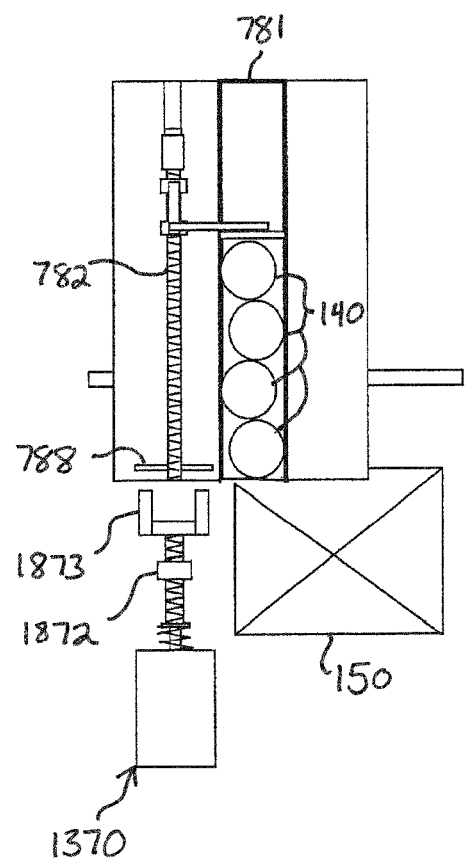
FIG. 23 is a top view illustrating how the non-co-axial coupler is positioned in such a manner that the "U" engaging screw is substantially in-line with lead screw prior to removing articles from the shelf.

FIG. 23 is a top view illustrating how the non-co-axial coupler 1370 is positioned in such a manner that the "U" engaging screw 1873 is substantially in-line with lead screw 782 prior to removing articles from the shelf.

Figure 24:
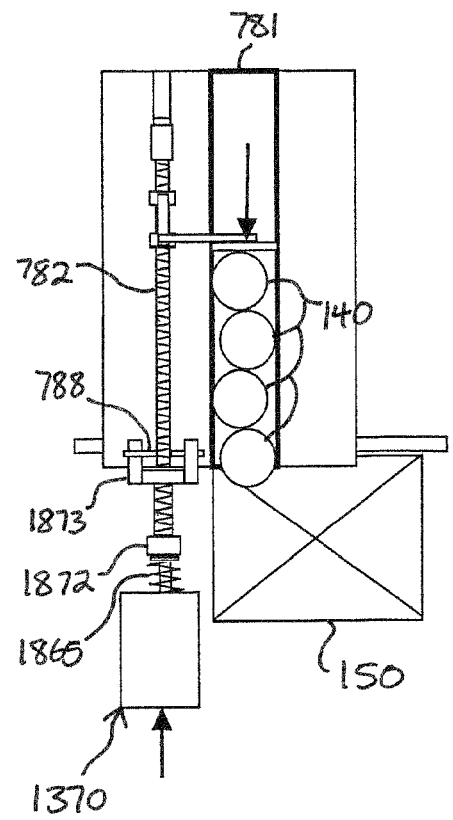
FIG. 24 is a top view illustrating how the motor is energized, the "U" engaging fork advances through the stud and nut assembly, compresses spring and engages lead screw's "T" ending that may cause articles to be removed from the shelf.

FIG. 24 is a top view illustrating how a motor 1364 is energized, the "U" engaging fork 1873 advances through the stud and nut 1872 assembly, compresses spring 1865 and engages lead screw's 782 "T" ending 788 that may cause articles to be removed from the shelf. This causes the lead screw 782 to turn and thus advances the load-carrying nut-system 785, the metallic arm 786 and the push-up surface 787. The push up surface 787 pushes the articles 140 toward transferring edge 736 and into container 150. When the end of the threads of the "U" engaging fork 73 is reached, the non-co-axial coupler 1370 ceases to advance and spring 1865 is fully compressed. As motor 1364 continue to turn, articles 140 continue to be pushed towards the transferring edge 736 until the article 140 closest to the edge transfers into the container 150. When all the articles 140 that are desired to be transferred from the present shelf location, have been transferred into container 150, the software program reverses the rotation of motor 1364. Spring 1865, which is has been compressed between motor 1364 and the stud and nut 1872, forces the "U" engaging fork's 1873 to re-thread itself through the nut component of the stud and nut 1872 thereby retracting the non-co-axial coupler 1370 and des-engaging the "U" engaging fork 1873 from the lead screw 782. The different assemblies' positions will again be in accordance with FIG. 23.

Figure 25:
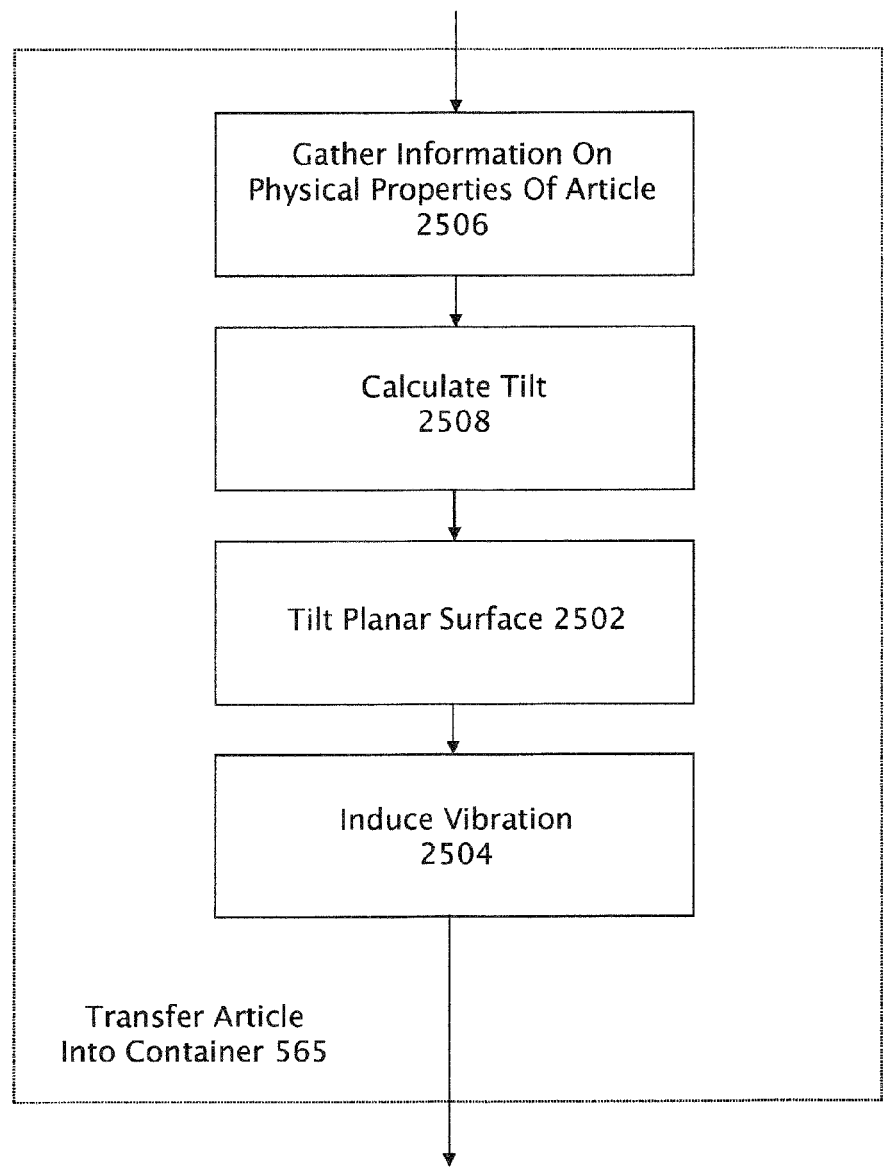
FIG. 25 shows the process of transferring articles from the shelf into the container begins by determining the desired amount of tumble control (565 of FIG. 5) when transferring each article.

FIG. 25 shows the process of transferring articles from the shelf into the container begins by determining the desired amount of tumble control (565 of FIG. 5) when transferring each article. If the transfer is allow to happen without any control, the article will tumble during the free fall into the container and it is impossible to accurately predict where the article will land inside the container. Since one of the features of the present example is to organize the articles inside the container as the articles are picked from the shelves, it is necessary to provide a way to control an article's transfer behavior. To do this, an example of a solution for controlling the transfer of an article from the planar surface into container will be hereby described. Furthermore, the example solution shown also addresses the problem of placement of an article into a desired space inside the container and the problem presented by the transfer of fragile articles 140.

To determine the optimal transfer control for an article. The controlling software first gathers physical information about the article 2506. This information relates to the characteristics of the article and may include such parameters as weight, size, volume, and fragility, location of the center of gravity, content settling characteristics, physical state (solid, liquid, and gas) or any combination thereof. Then, the controlling software performs a series of calculations which predict the amount tilt needed 1508 to transfer the article in the controlled manner described above. Articles' physical information is generally received from the manufacturer. Other pertinent information can be independently acquired and recorded as an article is duly registered in the distribution center's inventory database.

The example solution calls for tilting the planar surface and the container with respect to the horizontal plane 2502. The angle formed between the level plane and the planar surface may or may not be equal to the angle formed by the bottom of container. As the angle increases towards the vertical plane, the articles tend to transfer in a slower and more controlled fashion to the point that a mechanical vibration may have to be introduced 2504 to aid in the transfer of an article from the shelf.

In other examples of transferring and organizing articles from a shelf into a container, additional transfer control may be necessary when articles have a tendency to rotate to the right or to the left when they transfer from the shelf into the container. In addition to the transfer control process described above, the pick trolley's frame is fitted with two or more article fall control wands. The fall control wands are located above the container and directly across the article that is being transferred. These fall control wands are positioned by the controlling software on each side of the falling article's pre-calculated fall path. Thus, is the article tends to fall to the right, or the left, the fall control wands tend to control this tending and helps the item centered as it falls.

In applications where it may not be required to organize the transferring articles as they are picked from the shelves into the containers, the angle is left substantially horizontal. In these cases, transferring speed is gained, helping make the operation faster and more efficient.

Figure 26:
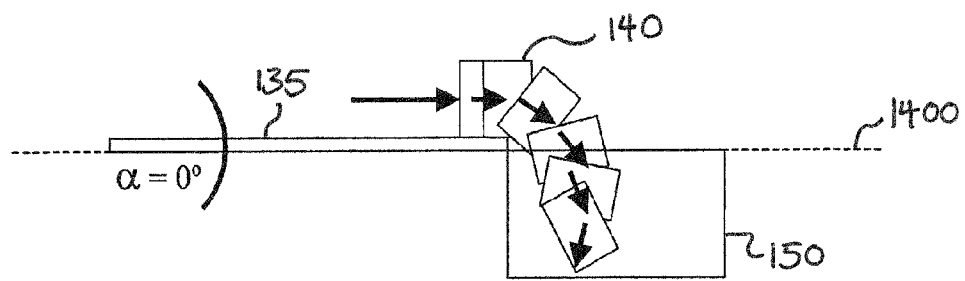
FIG. 26 depicts the conventional uncontrolled transfer of an article from a horizontal planar surface into a container.

FIG. 26 depicts the conventional uncontrolled transfer of an article 140 from a horizontal planar surface 135 into a container 150. Uncontrolled transfers represent a problem when it is desired to transfer an article 140 into a predetermined space inside the container 150. Uncontrolled transfers are also undesirable when transferring fragile articles 140. However, there are applications where uncontrolled transfers do not represent a problem. In this figure, it can be seen that when the planar surface's 135 angle is at or nearly horizontally level, the article 140 tumbles uncontrolled and violently into the box as it is pushed from behind. This tumbling happens when the article's 140 center of gravity is no longer supported by the planar surface 135. The amount of tilt is measured from a level plane 1400, which intersects the planar shelf 135, may vary from zero degrees to an angle that meets or exceeds the following example condition: the cosine of angle a must be equal or greater than half the length 300 of the side of the article 140 which is in contact with the planar surface shelf 135. This is given by the following equation:

$$\text{Cos a} => \text{Length 300} \qquad (1)$$

Figure 27:
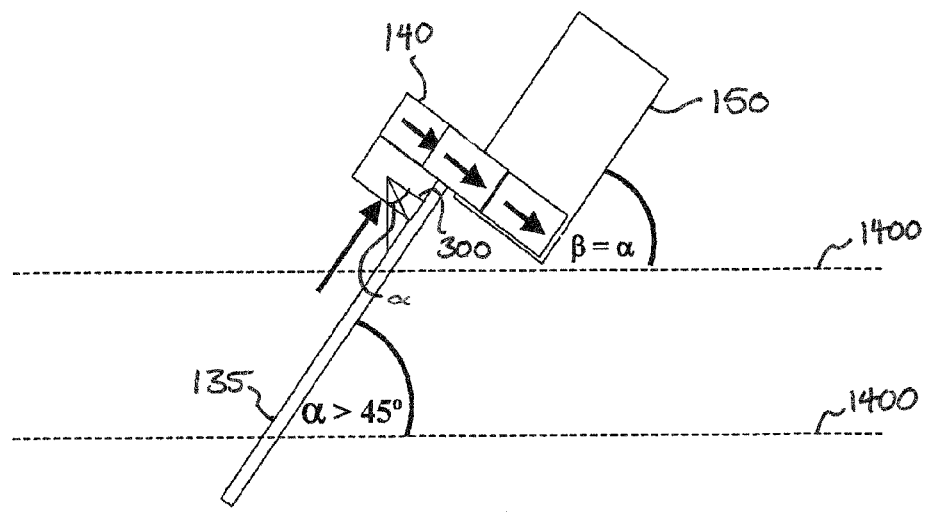
FIG. 27 shows a method for controlling the transfer of an article from the planar surface into container.

FIG. 27 shows a method for controlling the transfer of an article 140 from the planar surface 135 into container 150. Furthermore, the solution shown also addresses the problem of placement of an article 140 into a desired space inside the container 150 and the problem presented by the transfer of fragile articles 140. The problem is resolved by tilting the planar surface 135 and the container 150 with respect to the horizontal plane 300. The angle formed between the level plane 300 and the planar surface 135 may or may not be equal to the angle formed by the bottom of container 150. As the angle increases towards the vertical plane, the articles 140 tend to transfer in a slower and more controlled fashion to the point that a mechanical vibration may have to be introduced to aid in the transfer of an article 140 from the shelf.

Figure 28:
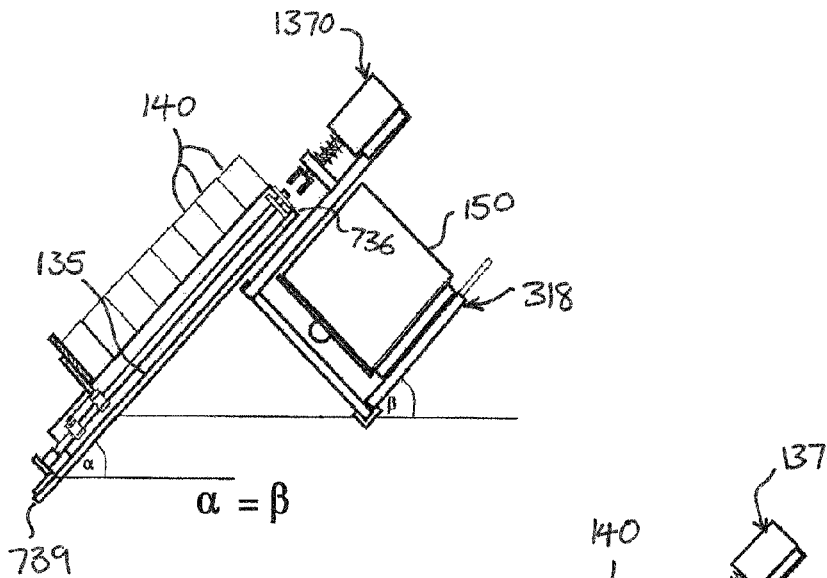
FIG. 28 illustrates how in order to control an article's transferring behavior, such as velocity or propensity to tumble, the planar surface attached on top of spanner beams are tilted about its longitudinal axis in such a manner that the transferring edge is higher than its opposite edge.

FIG. 28 illustrates how in order to control an article's 140 transferring behavior, such as velocity or propensity to tumble, the planar surface 135 attached on top of spanner beams 1332 and 1333 is tilted about its longitudinal axis in such a manner that the transferring edge 736 is higher than its opposite edge 739. The amount of planar surface 135 tilts from a substantially level position is determined by the desired behavior of an article 140 as it transfers from the transferring edge 736 into a container 150. For example, as transferring edge 736 is higher in relation to opposite edge 739, the velocity at which an article 140 transfers from the transferring edge 736 to the container 150 is diminished. Equally, as transferring edge 736 is higher in relation to opposite edge 739, an article's 140 propensity to tumble as it transfers from the transferring edge 736 to the container 150 is diminished. The planar shelf surface 135 is tilted about its longitudinal axis in such a manner that the transferring edge 736 is higher than its opposite edge 739.

Figure 29:
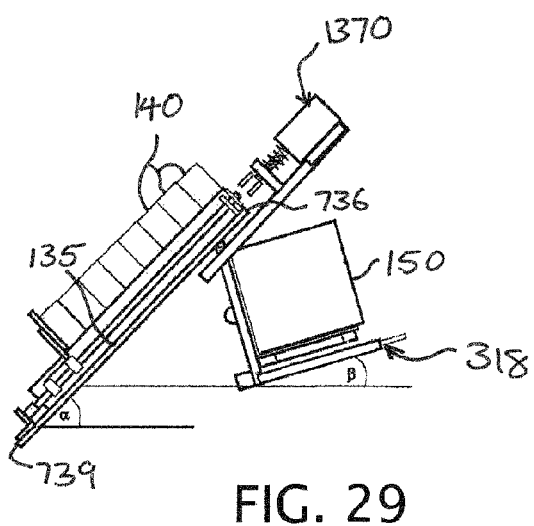
FIG. 29 illustrates that as angles a and b change the pick trolley member, to which the non-co-axial coupler is attached, is maintained substantially parallel to the planar shelf surface, in order to be able to engage lead screw.

FIG. 29 illustrates that as angles a and b change, pick trolley member 56a, to which the non-co-axial coupler 70 is attached, maintains substantially parallel to the planar shelf surface 135, in order to be able to engage lead screw 782. However, as depicted in FIG. 20, the rest of the pick trolley 56 does not have to maintain substantially orthogonal to planar shelf surface 135. The tilt angle b of container 150 is independently modified with respect to level plane 1400. This is to allow different transfer effects of articles 140 into container 150.

Figure 30:
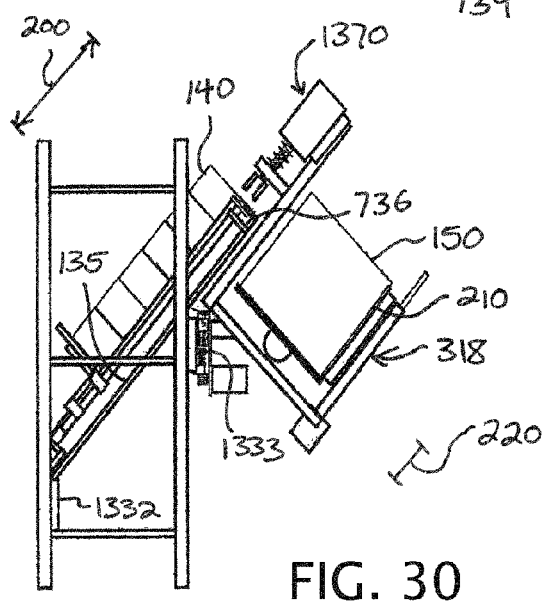
FIG. 30 illustrates that this planar surface is supported on spanner beams in such a manner that the transferring edge overhangs with respect to spanner beam by a minimal distance equal or greater to the length of side of the container, which is substantially orthogonal to transferring edge and substantially parallel to the planar shelf surface, minus the length of the side of article which is in contact with planar shelf surface and closest to transferring edge.

FIG. 30 illustrates that the planar surface 135 is supported on spanner beams 1332 and 1333 in such a manner that the transferring edge 736 overhangs with respect to spanner beam 1333 by a minimal distance 200 equal or greater to the length of side 210 of the container 150, which is substantially orthogonal to transferring edge 736 and substantially parallel to the planar shelf surface 135, minus the length 220 of the side of article 140 which is in contact with planar shelf surface 135 and closest to transferring edge 736. This is given by the following equation:

$$\text{Length 200} >= \text{length 210} - \text{length 220} \qquad (2)$$

Figure 31:
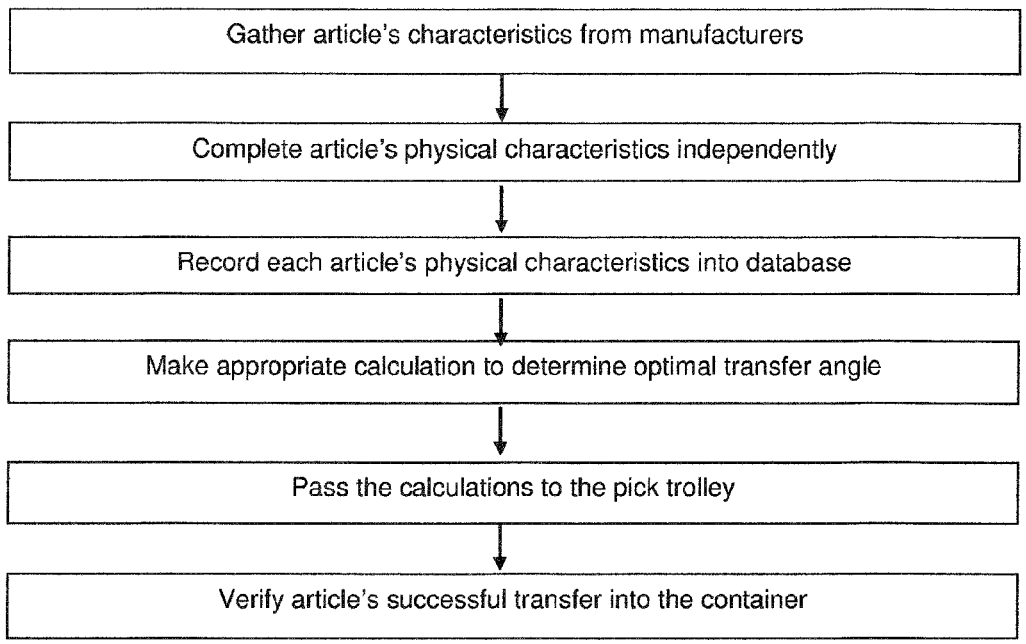
FIG. 31 is a flow diagram showing how to determine the optimal transfer control for an article which is a sub-process of transferring articles into a container (555 of FIG. 15).

FIG. 31 is a flow diagram showing how to determine the optimal transfer control for an article which is a sub-process of transferring articles into a container (555 of FIG. 5). The controlling software first gathers physical information about the article. This information relates to the characteristics of the article and may include such parameters as weight, size, volume, and fragility, location of the center of gravity, content settling characteristics, physical state (solid, liquid, and gas) or any combination thereof. Then, the controlling software performs a series of calculations, which predict the amount tilt required to transfer the article in the controlled manner described above.

Figure 32:
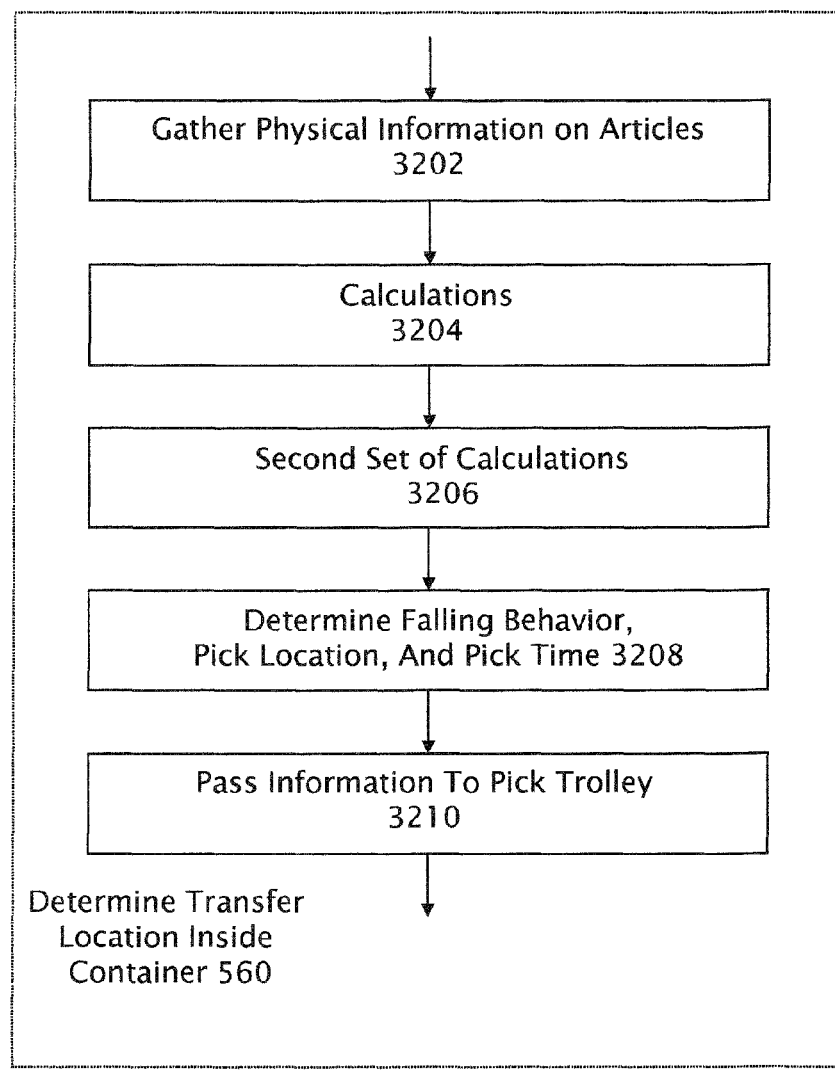
FIG. 32 shows a process of determining a transfer location inside a container (560 of FIG. 5) which is a sub-process of transferring articles into a container (440 of FIG. 5).

FIG. 32 shows a process of determining a transfer location inside a container (560 of FIG. 5) which is a sub-process of transferring articles into a container (440 of FIG. 5). Once the optimal transfer angle has been determined, the next process is to successfully organize the articles inside the container and determine the order in which articles are transferred into the container to insure that heavy articles will not be transferred on top of fragile articles. To do this, the controller software calculates and pre-determines when and where an article is transferred into the container. Once the space inside the container is determined for an article, the space must be brought underneath the article and positioned according to the pre-calculated transfer behavior for that article. This is done by moving the container towards or away and to the right or left with respect to the transfer channel location (in the X and Y directions with respect to the transfer channel transferring edge). The process described in the following paragraphs.

The controlling software first gathers physical information 3202 about each article. This information relates to the physical characteristics of the article and may include such parameters as weight, size, volume, and fragility, location of the center of gravity, content settling characteristics, physical state (solid, liquid, and gas) or any combination thereof. An articles' physical information is generally received from the manufacturer. Other pertinent information can be independently acquired and recorded as an article is duly registered in the distribution center's inventory database. Then, the controlling software performs a series of calculations 3204, which include taking into consideration the previously determined transfer angle to predict each article's free falling behavior. Next, the controller software makes a new series of calculations using an article's fragility index to determine where in the container is the optimal location for the article and what other articles, if any, may be transferred on top of it 3206. The result of these calculations also yields the optimal pick location and time where an article should be transferred.

This information is used by the controlling software to slot the shelves prior to order assembly. Once an article's free falling behavior, pick location and pick time are determined, 3208 the container's position is pre-calculated and the coordinates, slot address and pick time are passed along to the pick trolley 3210.

Figure 33:
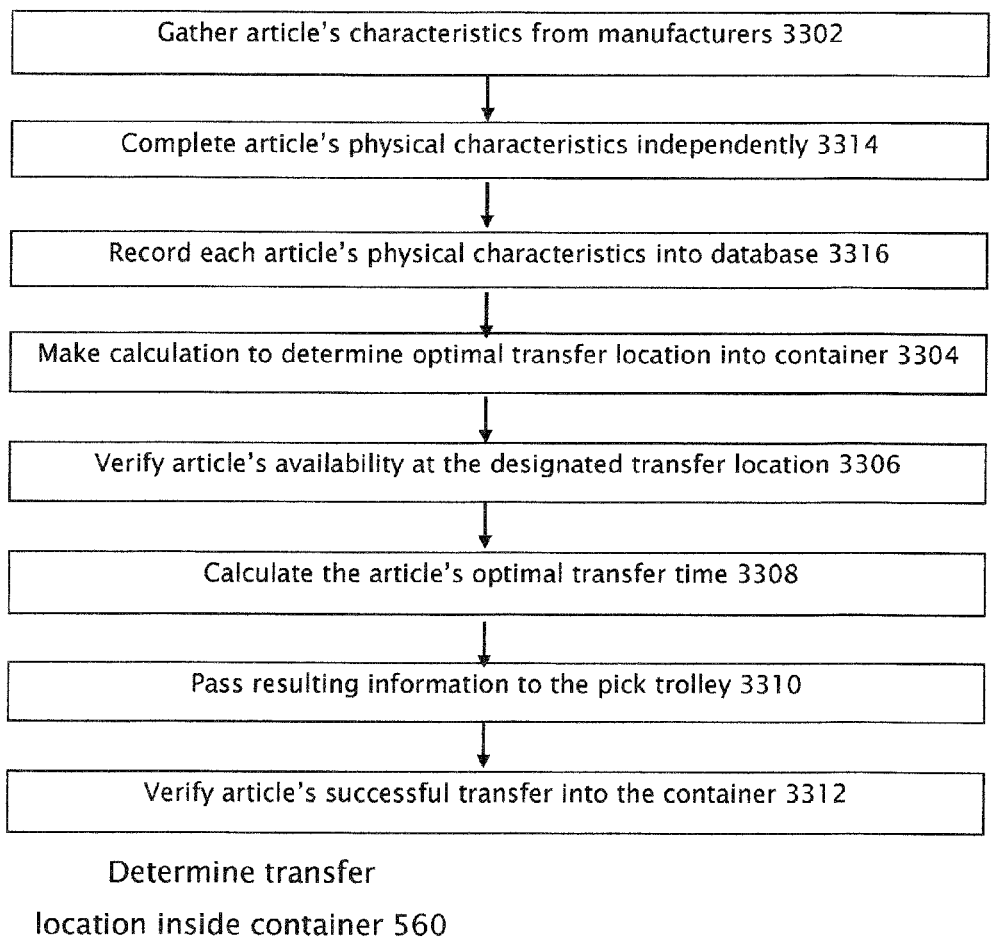
FIG. 33 shows further details of a process of determining a transfer location inside a container (560 of FIG. 5) which is a sub-process of transferring articles into a container (440 of FIG. 5).

FIG. 33 shows further details of a process of determining a transfer location inside a container (560 of FIG. 5) which is a sub-process of transferring articles into a container (440 of FIG. 5). Shown is how to determine the optimal transfer control for an article 3302. If needed, physical characteristics are completed independently 3314. Next, the characteristics may be entered in a database 3316. The controlling software first gathers physical information about the article. This information relates to the physical characteristics of the article and may include such parameters as weight, size, volume, and fragility, location of the center of gravity, content settling characteristics, physical state (solid, liquid, and gas) or any combination thereof. Then, the controlling software uses the articles' information to perform a series of calculations to determine the optimal transfer location within the container 3304. The calculations also predetermine the shelf location where the article is to be transferred from and the order in which the articles will be picked from the shelf. Then the controlling software verifies the article's availability at the pre-designated transfer location 3306. Next, the controlling software calculates the article's optimal transfer time. Then, the resulting information is passed to the appropriate pick trolley and verification of the article successful transfer into the container is performed.

Figure 34:
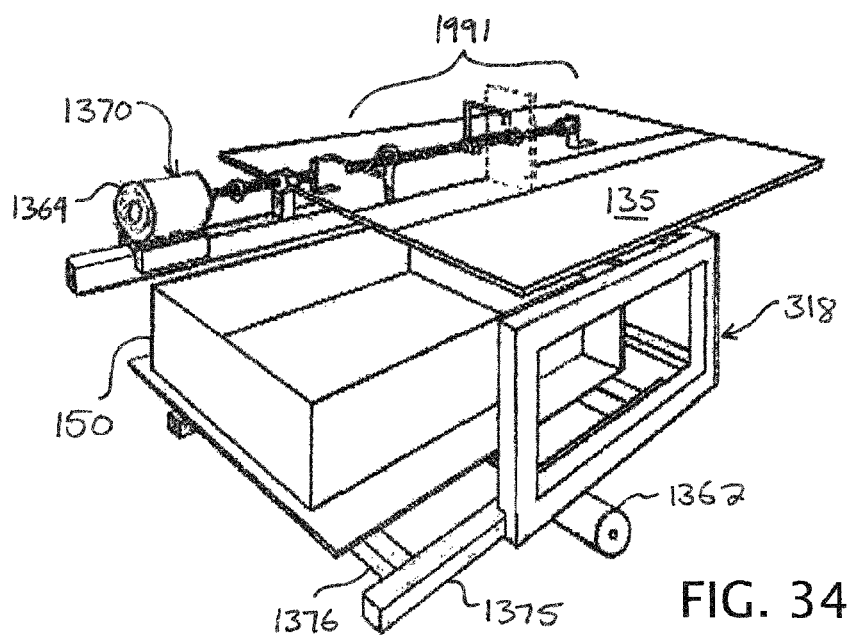
FIG. 34 shows a perspective view of the interaction between the planar shelf surface and the pick trolley.

FIG. 34 shows a perspective view of the interaction between the planar shelf surface 135 and the pick trolley 318. Pick trolley 318, carrying the container 150 and the non-co-axial coupler 1370, arrives to an article's 140 location and stops when the non-co-axial coupler 1370 is substantially in line with the article pushing assembly 1991. The container is then positioned, by activating the telescopic screws 1375 and/or 1376 so the article 140 will transfer into the container in the desired pre-determined space. The non-co-axial coupler 1370 is then powered by motor 1364 to engage the article pushing assembly 1991 and cause it to transfer one or more articles 140 into the container 150. This figure also illustrates pick trolley 318 and the telescoping extensions 1376 and 1375 in the X and Y directions respectively. These telescoping extensions extend and retract to position container 150 in a pre-calculated location so that articles 140 transfer into and lay next to each other inside container 150. Once an article 140 has been transferred into the container 150, and is resting inside it, power sources 1362 and 1363 re-position container 150 by extending or retracting in the appropriate directions (X and Y directions, with respect to edge 736), so that the next article 140 to be transferred lands in a free and pre-determined place inside container 150. The article 140 transferred could be made to land in an empty space at the bottom of the container 150 or on top of another article 140, which was previously transferred into container 150. It is noted in this figure, that the article feeding mechanism 1991, which advances articles towards transferring edge 736. The article feeding mechanism 1991 consists of two main parts. The article pushing assembly 1991, which is attached to the planar shelf surface 135 and is stationary, and the non-co-axial coupler 70, attached to pick trolley 318. Pick trolley 318 rides along the C-channel rail 1455 (described in FIG. 14) bringing container 150 and the non-co-axial coupler 1370 assembly. The non-co-axial coupler 1370 couples with the article pushing assembly 1991 to deliver mechanical power and cause the article pushing assembly 1991 to transfer articles 140 into container 150.

Figure 35:
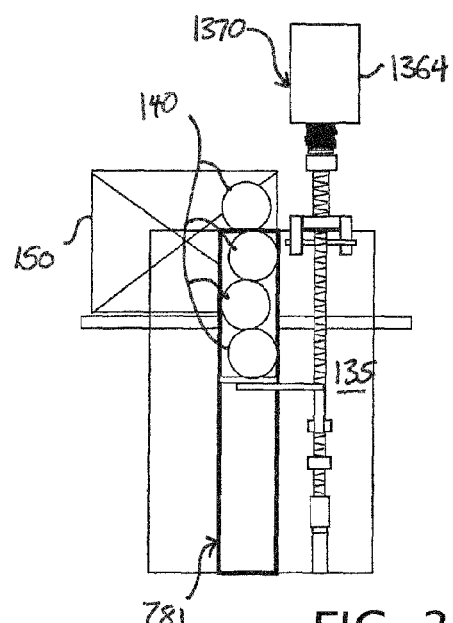
FIG. 35 shows how a container is positioned so article lands on the northeast corner of container.

FIG. 35 shows how a container 150 is positioned so article 140 lands on the northeast corner of container 150. This is done by turning on motor 1363 (not shown), which extends and/or retracts telescopic rail frame extension 1375. As telescopic rail frame extension 1375 extends or retracts, container 150 moves in the Y direction with respect to transfer edge 736.

Figure 36:
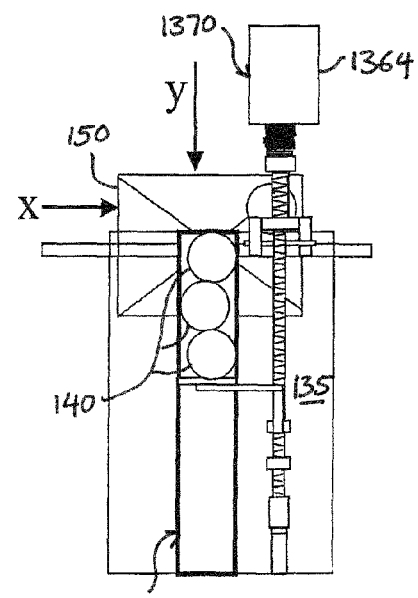
FIG. 36 shows how the container is again repositioned, this time by turning a motor (not shown), which extends and/or retracts the telescopic rail frame extension.

FIG. 36 shows how the container 150 is again repositioned, this time by a turning motor 1362 (not shown), which extends and/or retracts the telescopic rail frame extension 1376. As telescopic rail frame extension 1375 extends or retracts, container 150 moves in the X direction with respect to transfer edge 736. Once container 150 is in the desired position, article 140*a* will land alongside article 140, which is already inside container 150.

During order assembly, clip trolleys 317 and pick trolleys 318 typically ride along the track infrastructure 128 in the same direction. When a trolley reaches the end of the aisle, it proceeds in one of several alternative ways according to the progress of the task at hand. For example, if the container is full, the trolley releases the container to shipping and proceeds to be ferried, by the turning turret 316 located at the end of the aisle, to the opposite side of the rack shelving where it receives another order assembly request and start a new order assembling cycle. However, if the container is not full, the trolley is ferried by the turning turret 316 located at the end of the aisle, to the opposite side of the rack shelving where it continues assembling the order. If the articles that remain to be picked to complete the assembly of the order at hand are located in other levels or in other rack shelving, the trolley will make use of the network of turning turrets 316 to navigate from rack to rack throughout the distribution center until it finally comes to the desired article's pick location.

Figure 37:
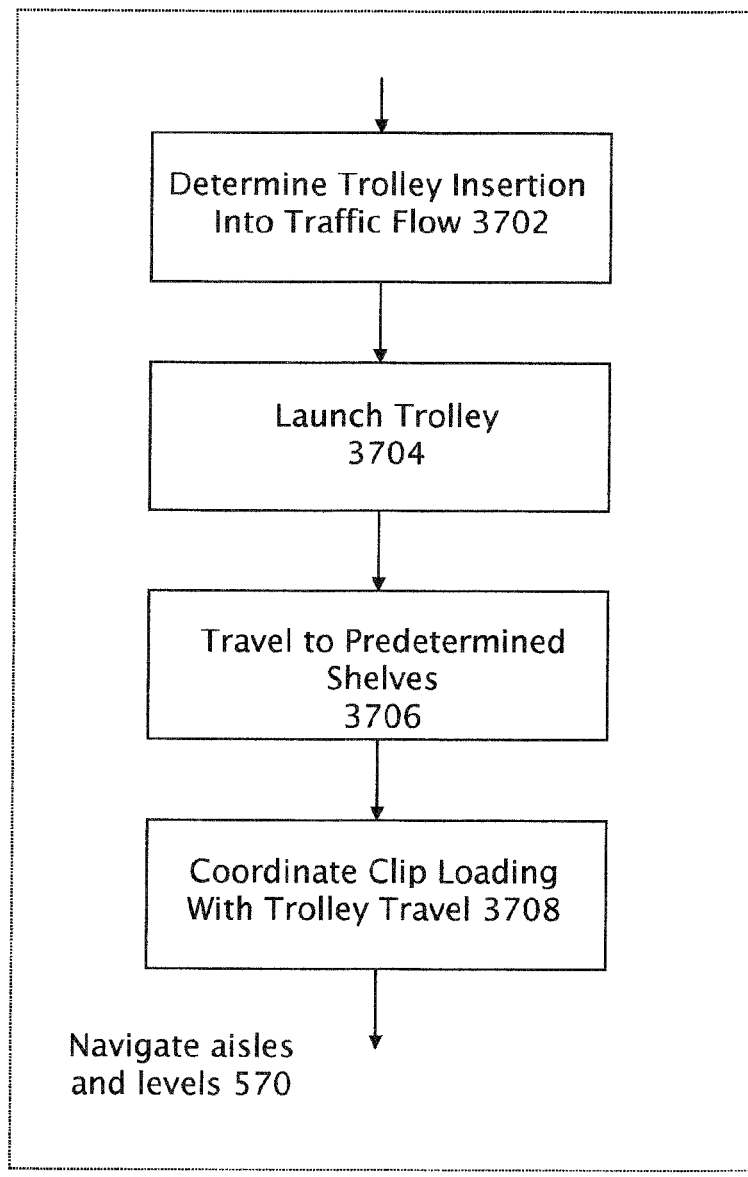
FIG. 37 in a process flow diagram showing the navigation of isles and levels (570 of FIG. 5) which is a sub-process of transferring articles into a container (440 of FIG. 5).

FIG. 37 is a process flow diagram showing navigation of isles (570 of FIG. 5) and levels which is a sub-process of transferring articles into a container (440 of FIG. 5). First, a determination is made to find where to insert the trolley into the existing traffic flow in the distribution center 3702. Next, the trolley is launched into the traffic flow 3702. Then, the trolley travels to predetermined shelves to load articles 3706. In traveling to the predetermined shelves, coordination is made to determine the shortest route of travel in filling a given order. Next, coordination is made between clip loading with the trolley travel 3708. Clip loading coordination is made to insure that a sufficient number of goods are present to fill the order when the trolley arrives at the shelf location.

Figure 38:
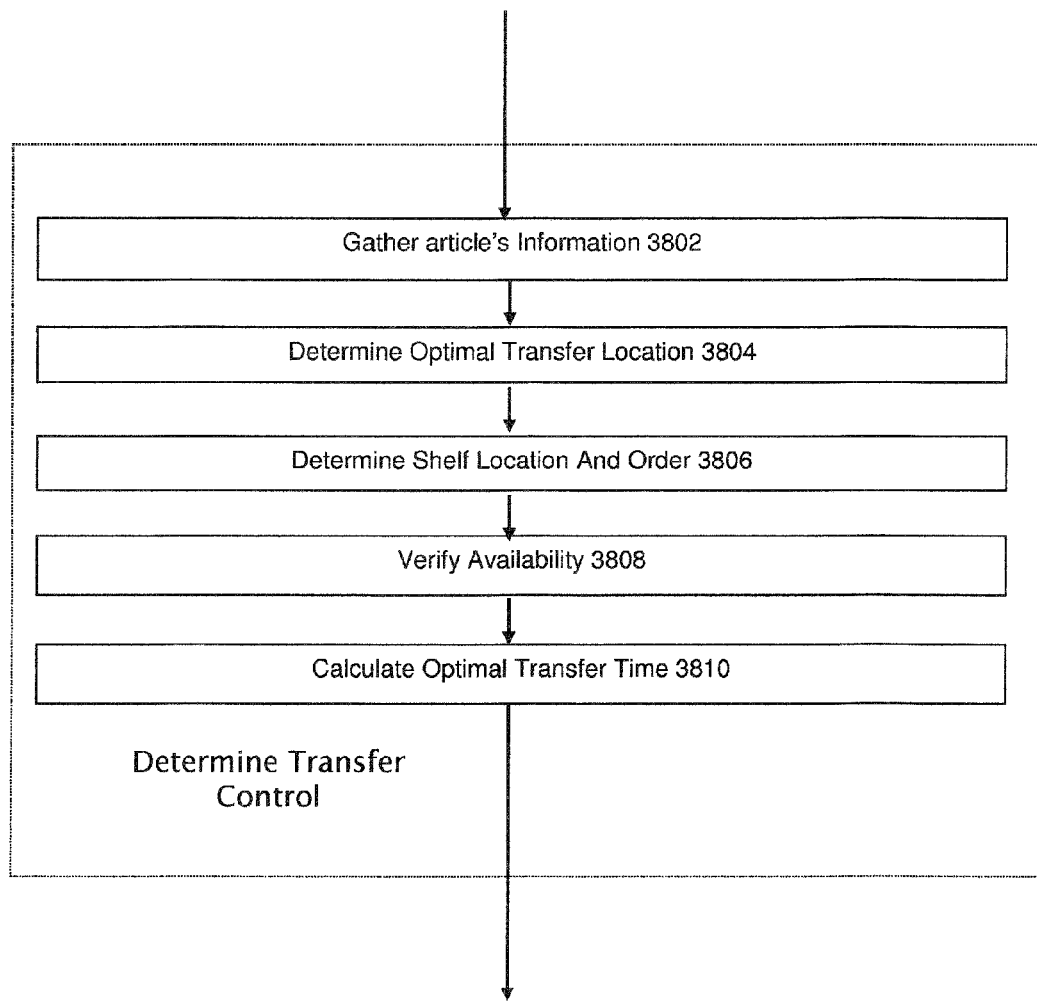
FIG. 38 shows how to determine the optimal transfer control for an article.

FIG. 38 shows how to determine the optimal transfer control for an article. The controlling software first gathers physical information about the article 3802. This information relates to the physical characteristics of the article and may include such parameters as weight, size, volume, and fragility, location of the center of gravity, content settling characteristics, physical state (solid, liquid, and gas) or any combination thereof. Then, the controlling software uses the articles' information to perform a series of calculations to determine the optimal transfer location 3804 within the container. The calculations also predetermine the shelf location where the article is to be transferred from and the order in which the articles will be picked 3806 from the shelf. Then the controlling software verifies the article's availability 3808 at the pre-designated transfer location. Next the controlling software calculates the article's optimal transfer time 3810. Then, the resulting information is passed to the appropriate pick trolley and verification of the article successful transfer into the container is performed 3812.

Figure 39:
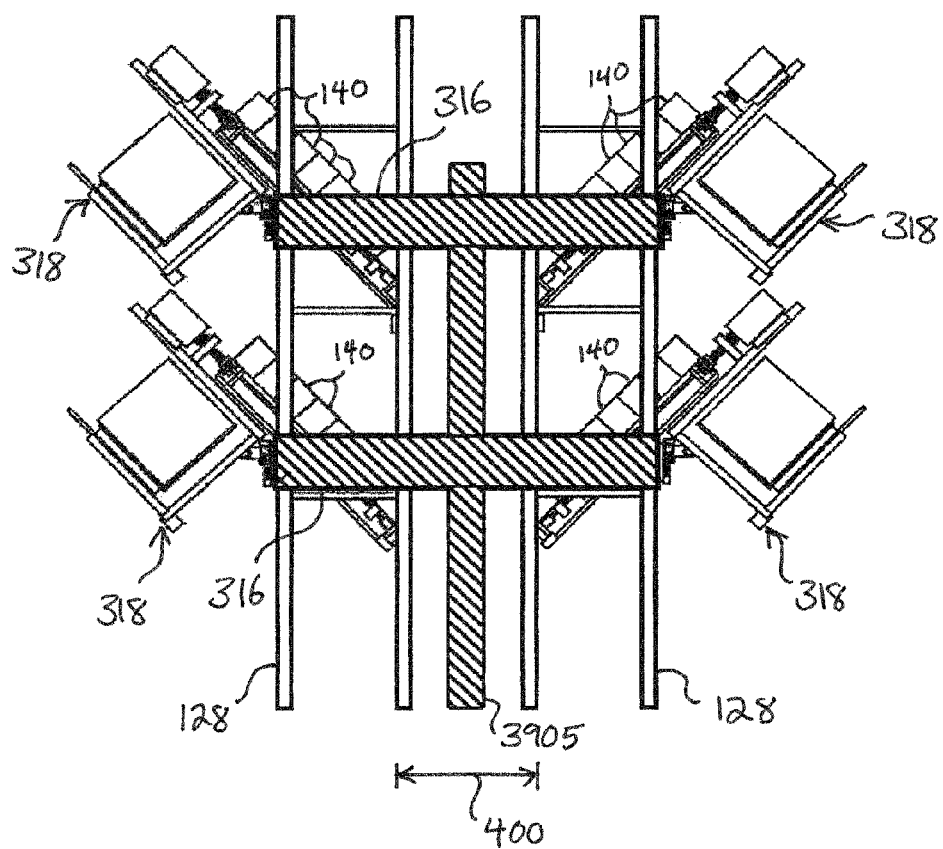
FIG. 39 shows four planar surfaces and four pick trolley assemblies of the present example of the invention installed in two rack shelves.

FIG. 39 shows four planar surfaces 135 and four pick trolley 318 assemblies of the present example of the invention installed in two rack shelves 128. The rack shelves 128 are mirror images of each other separated by a distance 400. Pick trolleys 318 are transferred from the left side rack shelf 128 to the right side rack shelf by the turning-t-turret 316. The turning-t-turrets 316 are located at each end of the rack shelf structure 128 and can transfer pick trolleys 318 from side to side horizontally or vertically by means of a telescopic raising/lowering shaft 3905. In this manner, the pick trolleys 318 are always going forward in a circuit fashion and may navigate the rack shelves to reach any pick location.

Figure 40:
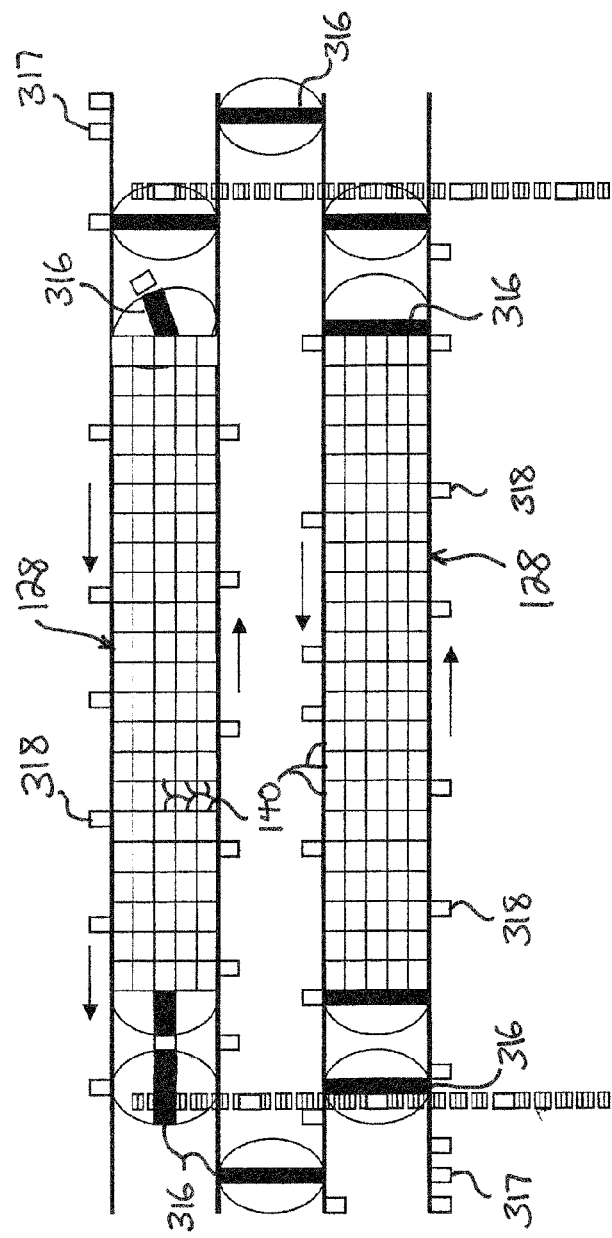
FIG. 40 shows how during the order assembly process, clip trolleys and pick trolleys typically ride along the track infrastructure typically in the same direction.

FIG. 40 shows how during the order assembly process, clip trolleys 317 and pick trolleys 318 typically ride along the track infrastructure 319 typically in the same direction. When a trolley reaches the end of the aisle, it proceeds in one of several alternative ways according to the progress of the task at hand. For example, if the container 150 is full, the trolley releases the container to shipping and proceeds to be ferried, by the turning turret 316 located at each end of the aisle, to the opposite side of the rack shelving where it receives another order assembly request and start a new order assembling cycle. However, if the container is not full the trolley is ferried, by the turning turret 316 located at the end of the aisle, to the opposite side of the rack shelving where it continues assembling the order. If the articles that remain to be picked to complete the assembly of the order at hand are located in other levels or in other rack shelving 128, the pick trolley 318 will make use of the network of turning turrets 316 to navigate from rack shelf 128 to rack shelf 128 throughout the distribution center until it finally comes to the desired article's 140 pick location.

Figure 41:
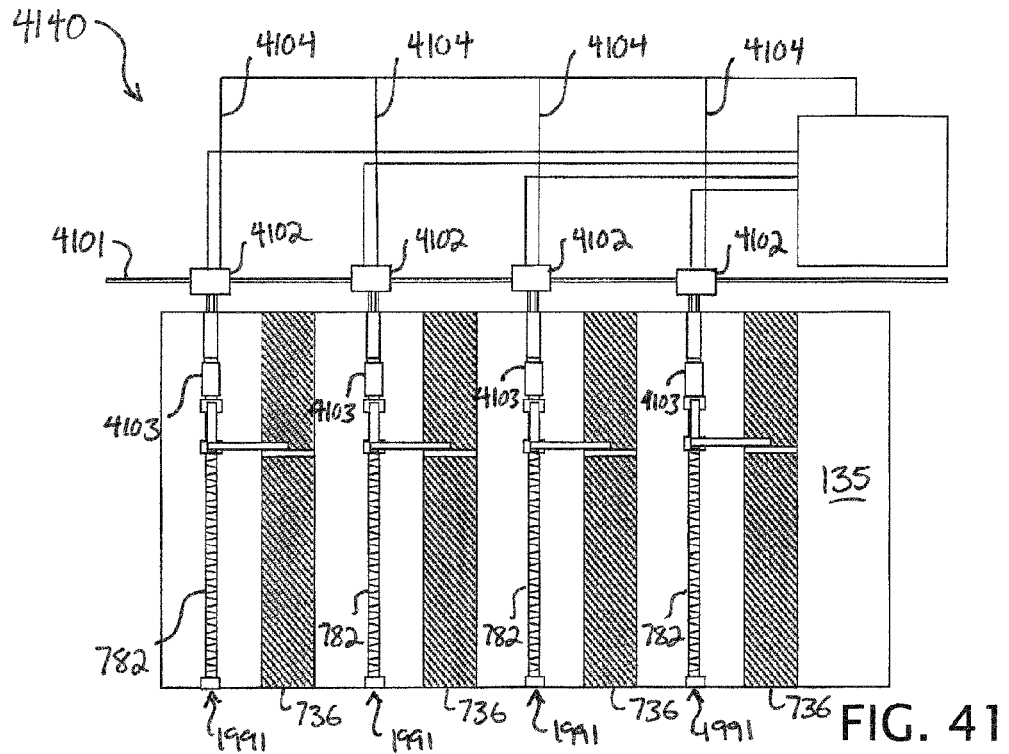
FIG. 41 depicts an alternative example, having a pneumatic or a hydraulic motor, that may be connected by a coupler or equivalent methods, to the end of each lead screw which is part of the article pushing assembly.

FIG. 41 depicts an alternative example 4140, having a pneumatic or a hydraulic motor 4101 that may be connected by a coupler or any equivalent method, to the end of each lead screw 782 which is part of the article pushing assembly 1991. One or more valves 4102, belonging to a computer controlled network of valves 4104, drive each pneumatic motor 4103. The valves 4103 open allowing pressurized air, steam, or any other suitable liquid or gas to enter and turn each pneumatic motor 4103. As the pneumatic motor 4103 turns, the article pushing assembly 1991 pushes articles towards the transferring end 736 of planar surface 135 and eventually into container 150. Valve 4102 closes to prevent the article pushing assembly 1991 from transferring any additional articles 140.

Figure 42:
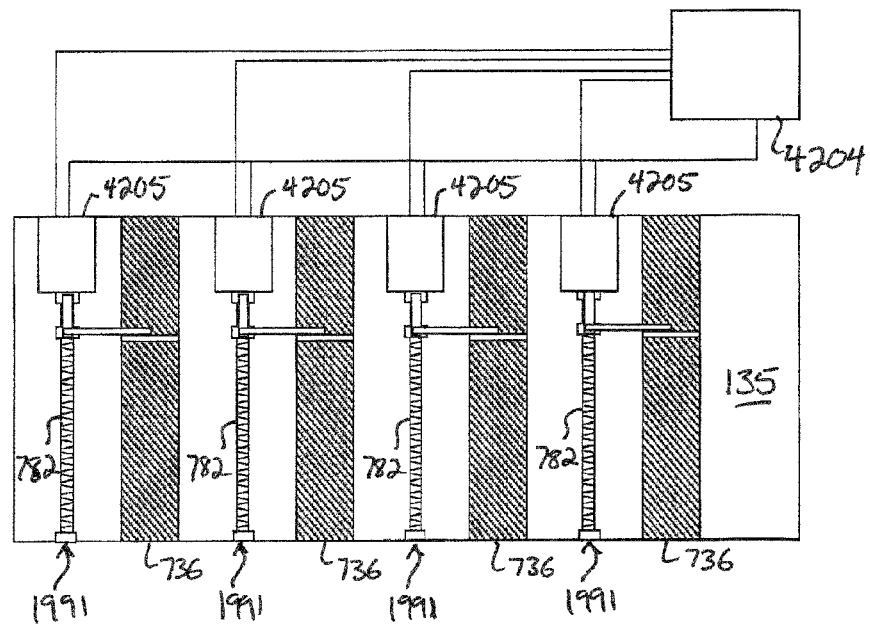
FIG. 42 illustrates a further alternative example, in which an electric motor, is connected by a coupler or any other means known in the art, to the end of each lead screw which is part of the article pushing assembly.

FIG. 42 illustrates a further alternative example, in this example, an electric motor 4205, is thereby connected by means of a coupler or any other means known in the art, to the end of each lead screw 782 which is part of the article pushing assembly 1991. One or more switches 4207, belonging to a computer controlled switch network 4204, drive each electric motor 4205. The switch 4207 turns on each electric motor 4205. As the electric motor 4205 turns, the article pushing assembly 1991 pushes articles towards the transferring edge 736 of planar surface 135 and eventually into a container. Switch 4207 is turned off to prevent the article pushing assembly 1991 from transferring any additional articles.

Many distribution and fulfillment centers process fulfillment orders in whole cases, as opposed to by the piece. For such operational needs, the present example can be configured to pick and build pallets of cases.

Figure 43:
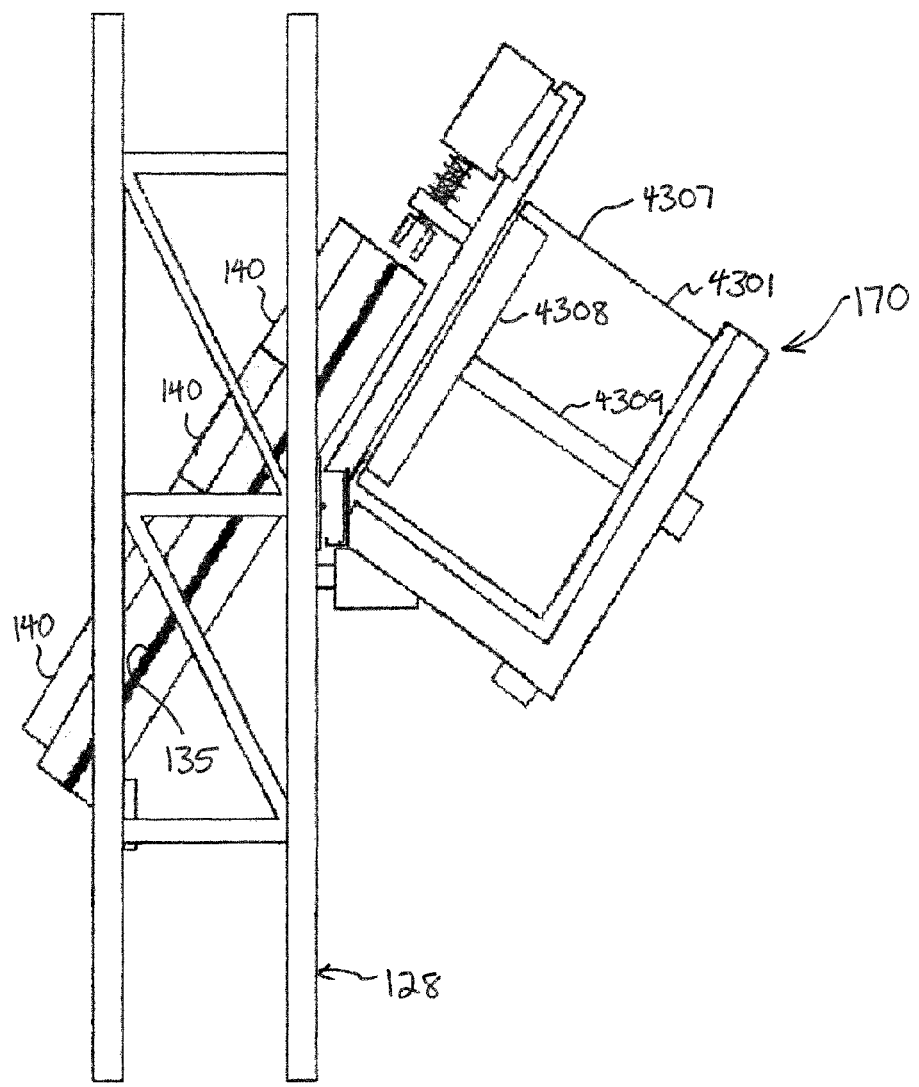
FIG. 43 illustrates yet another alternative example of the invention.

FIG. 43 illustrates yet another alternative example of the invention designated by the reference number 170. However, in the immediate example, stationary walls 4301 which are attached by means of screws, welding or any other manner known in the art to the pick trolley 318 and which form a topless and bottomless box 4307. The pick trolley's floor 4308, which is located inside box 4307, can be telescopically raised to the top of the box 4307, by means of a jack screw 4309, or any other means known in the art, to a position where the floor 4308 is flush with the transferring edge 736, from an initial position at the bottom of the box 4307. As cases are transferred into the box 4307, repositioning of the box in the X and Y directions is carried out, and the floor 4308 is lowered to accommodate the next case well within the box's 4307 walls 4301. The planar shelf surface 135 tilt angles can be increased or decreased to maintain a desired case 140 transfer controls.

Figure 44:
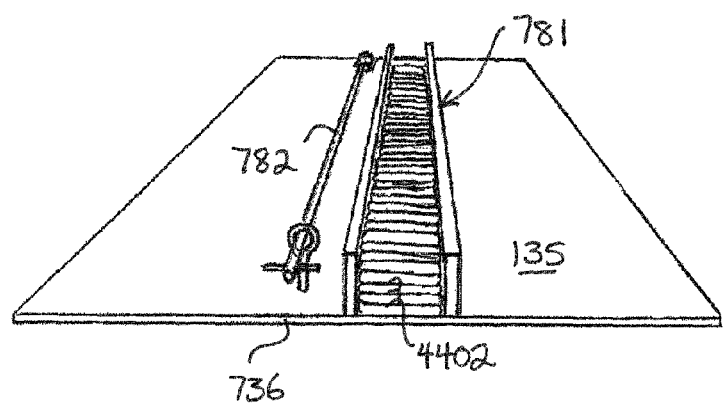
FIG. 44 is an alternative example of transfer channel clip's having a floor fitted with rollers.

FIG. 44 is an alternative example of the present invention illustrating the transfer channel clip's 781 having a floor fitted with rollers 4402.

Figure 45:
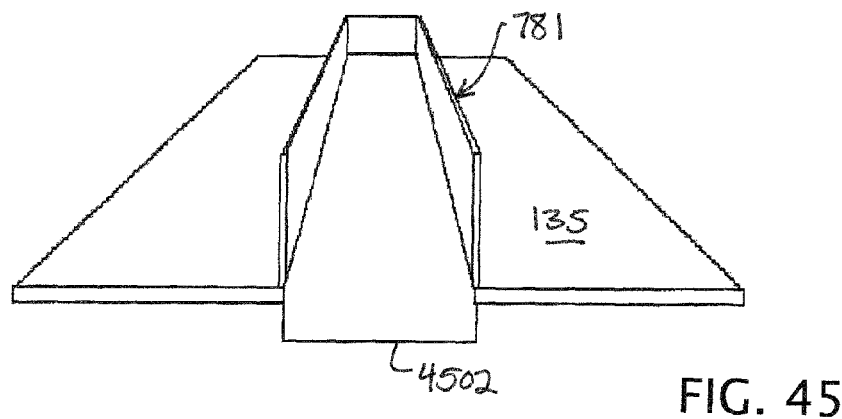
FIG. 45 shows another alternative example of a transfer channel clip's floor which would replace rollers with conveyor tape.

FIG. 45 shows another alternative example of a transfer channel clips floor which would replace rollers with travel tape. Another alternative example is depicted in FIG. 45, which would replace rollers 4402 in FIG. 44, with conveyor tape 4502. Transfer channel clip 781 flooring can also be fitted with different surface textures to minimize friction.

Figure 46:
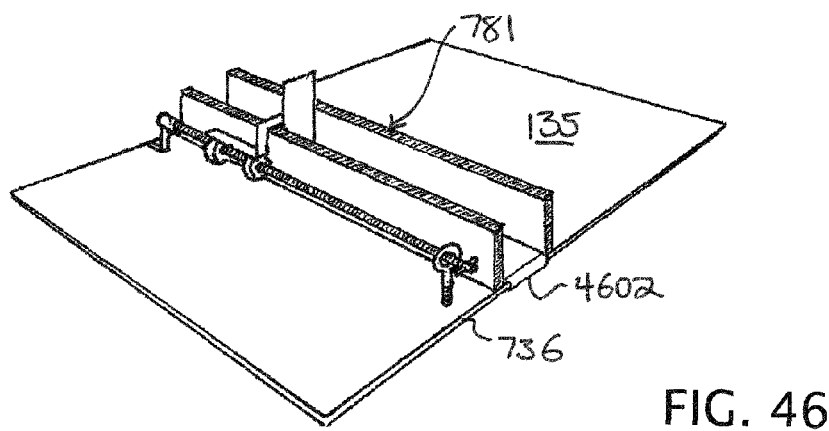
FIG. 46 depicts another alternative example of a transfer channel having a single roller placed at transferring edge.
Figure 47:
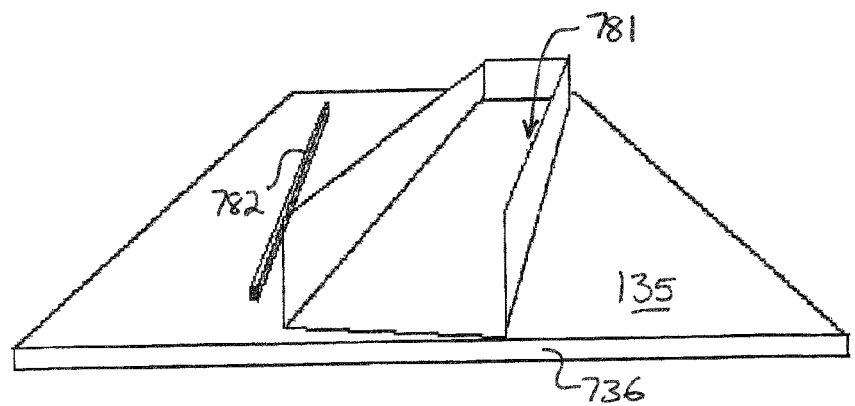
FIG. 47 illustrates an additional alternative example of transfer channel alignment which can be helpful in ensuring satisfactory article transferring performance.

FIG. 46 depicts another alternative example of a transfer channel having a single roller placed at transferring edge 736. This single roller 4602 is used to assist in transferring cylindrical shaped articles 140 which when standing on-end, tend to rotate right or left, relative to the line of travel, due to misalignment between the pushing vector and the article's 140 center of mass FIG. 47 illustrates an additional alternative example of transfer channel alignment of the present invention, which can be helpful in ensuring satisfactory article 140 transferring performance. FIG. 46 shows an additional example where transfer channel clip 781 turned to be substantially non-orthogonal to transferring edge 736.

Figure 48:
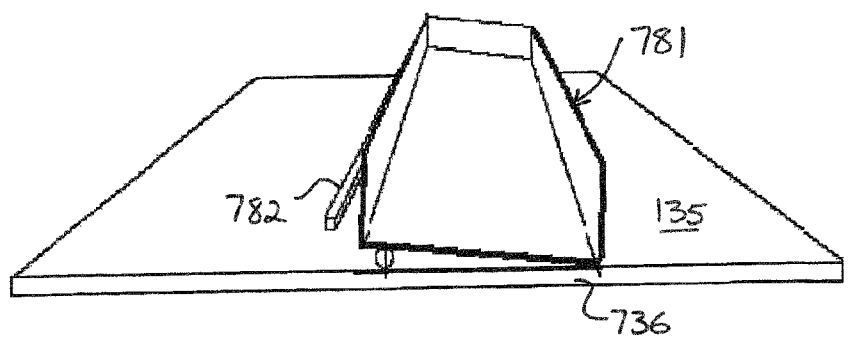
FIG. 48 shows how the transfer channel clip can be tilted about its longitudinal axis to cause articles traveling through it to lean towards one of the two transfer channel clip walls.

FIG. 48 shows how the transfer channel clip 781 can be tilted about its longitudinal axis to cause articles traveling through it to lean towards one of the two transfer channel clip 781 walls.

Figure 49:
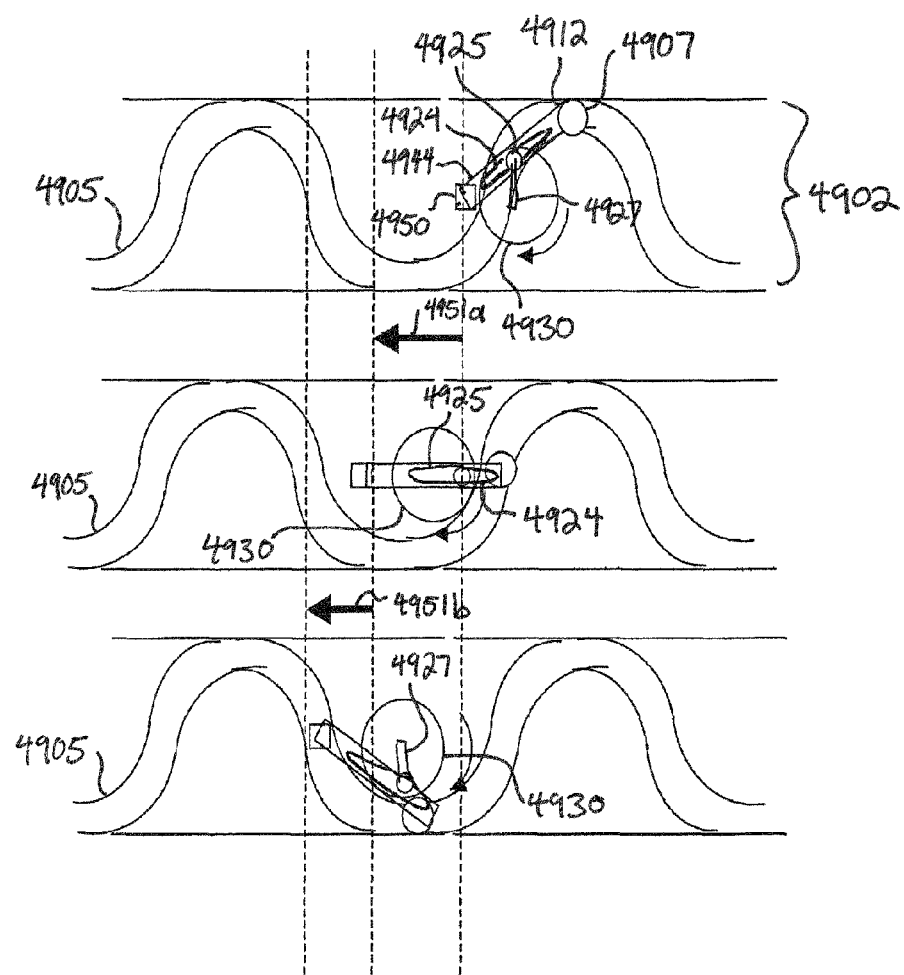
FIG. 49 shows a drive mechanism for clip trolleys, the pick trolleys or any other vehicle that may travel on the railing infrastructure.

FIG. 49 shows a drive mechanism for clip trolleys 317, the pick trolleys 318 or any other vehicle that may travel on the railing 319 infrastructure. The figure shows a track bed 4902 into which a groove 4905 in the form of a wave is carved. A wheel 4907 is set inside the groove 4905. The wheel 4907 is attached to one end of a flat connecting rod 4912, the opposite end 4944 of the flat connecting rod 4912 is fixed to the vehicle's frame 4950. The connecting rod 4912 is slit lengthwise 4924. A stud 4925 is inserted through the slit 4924 in the flat connecting rod 4912 and fixed to a crank arm 4927, which is in turn connected to a motor 4930. As the motor 4930 turns, the end of the flat connecting rod 4912 where the wheel 4907 is attached moves back and forth in a sweeping manner. When the wheel 4907 attached to the sweeping end of the connecting rod 4912 is inside the track groove 4905 and the motor 4930 is made to turn with sufficient force, the wheel 4907 presses against one of the walls of the grove 4905 and the result of this pressure is orthogonal, with respect to the groove 4905, translation motion of the vehicle frame. This motion and its direction are indicated by arrows 4951a and 4951b.

In addition, the flat connecting rod 4912 can be extended lengthwise in a manner that a second wheel 4908 being similar to wheel 4907 can be attached to the elongated end and position within the groove 4905 at substantially one half wave phase away, to make it possible to move a trolley, regardless of the point where it may stop in the groove 4905.

Figure 50:
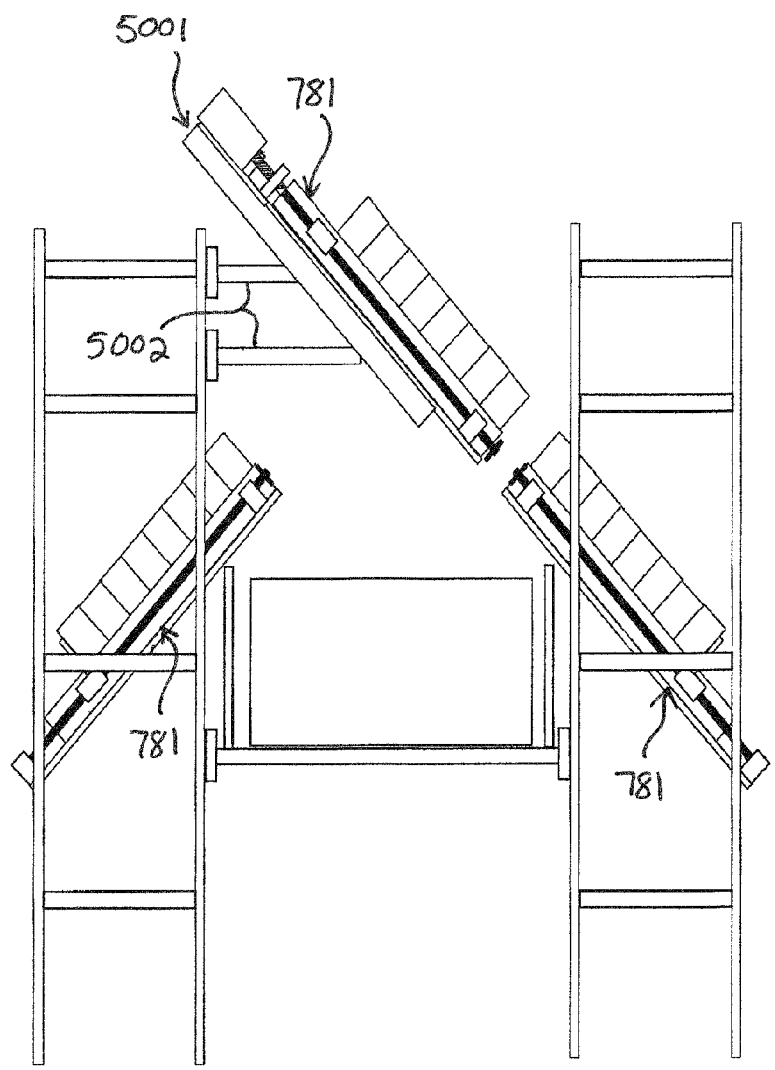
FIG. 50 shows an alternative example where a separate railing may be used for transporting clip trolleys.

FIG. 50 shows an alternative example where a separate railing may be used for transporting clip trolleys 5001. The separate railing infrastructure 5002 facilitates the loading of transfer channels clips 781 which may be of different dimensions or where the planar shelf surface 135 may be substantially different to the one described in this example.

Figure 51:
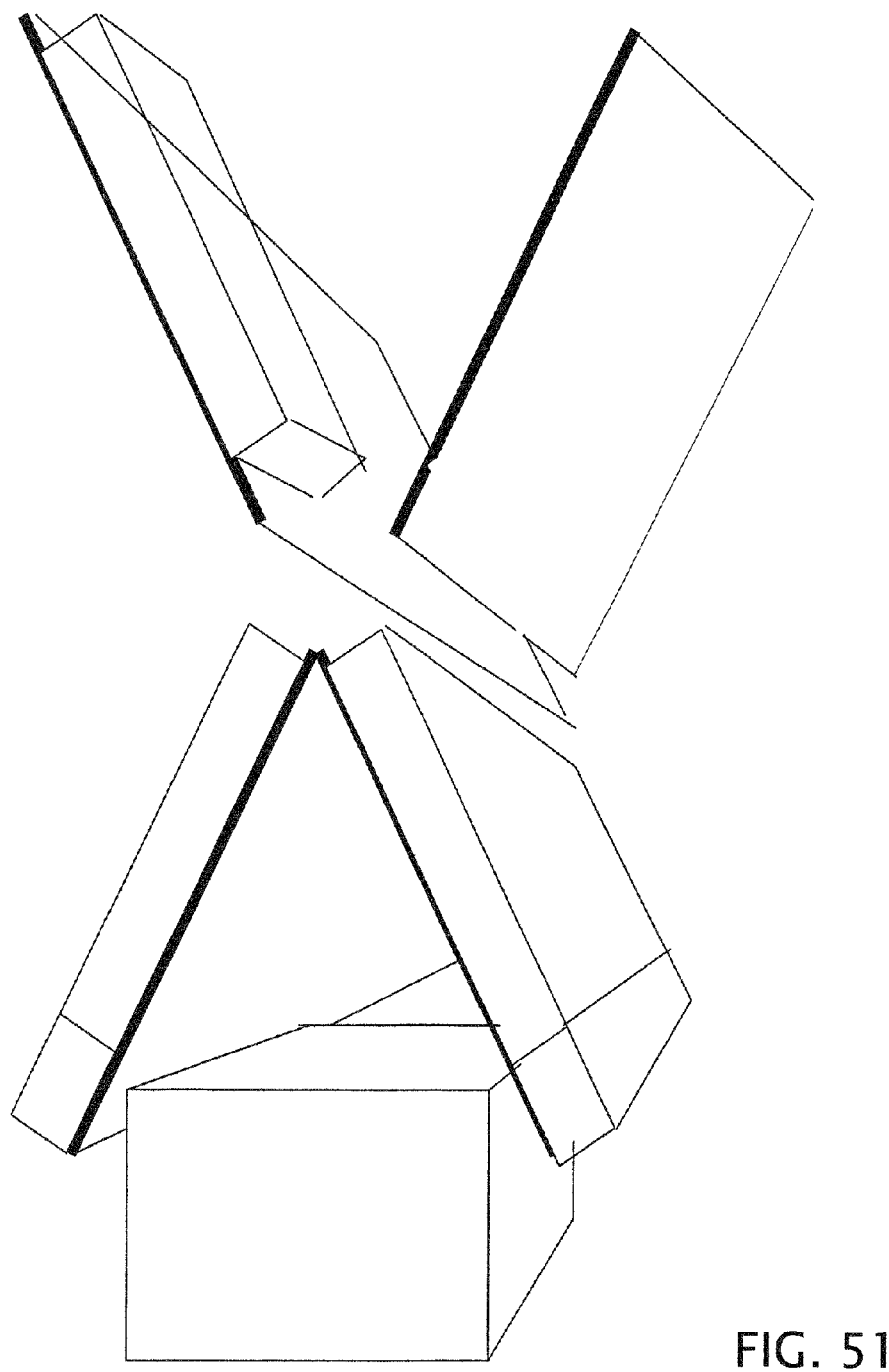
FIG. 51 shows a perspective view of an X-style clip loading system.

FIG. 51 shows a perspective view of an X-style clip loading system.

Figure 52:
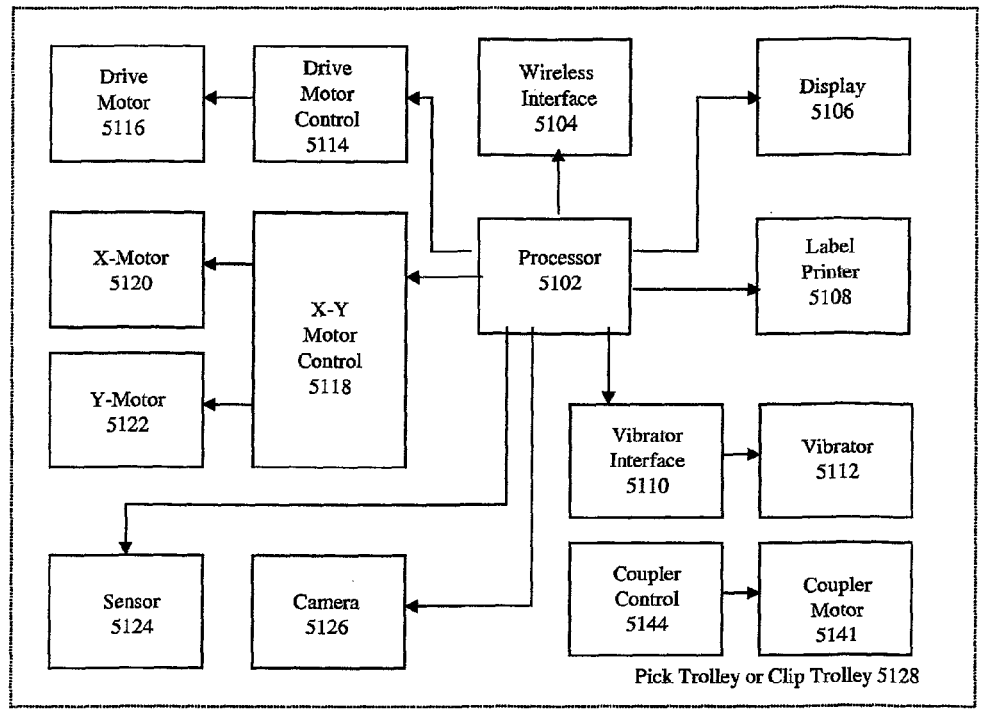
FIG. 52 in a block diagram of the order fulfillment system utilizing controlled transfer and packing.
Figure 52:
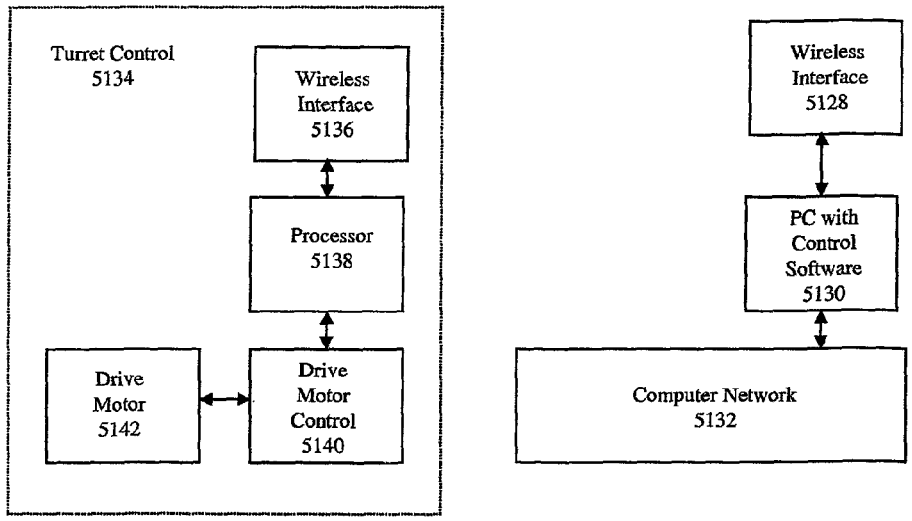

FIG. 52 in a block diagram of the order fulfillment system utilizing controlled transfer and packing. The pick 5128 trolley may include a microprocessor 5202 that is coupled to a conventional display 1506 suitable for displaying information to an operator. The microprocessor is may also be coupled to a label printer 5108 that is conventionally constructed or may be constructed to automatically apply the labels to the side of a shipping container when it is placed on the pick trolley. The microprocessor is also coupled to a wireless interface 5104 suitable for communicating with a computer network supplying instructions to the pick trolley. The microprocessor may also be coupled to a drive motor control 5114 that is constructed to drive the trolley system along the track and channel system. The drive motor control may also be connected to the drive system 5116 which is the actual mechanical system for driving the trolley. Alternatively, the wobble drive system described in FIG. 49 may be substituted for the drive system and the drive motor control.

The microprocessor is also coupled to a X-Y motor control 5118 for positioning the shipping container underneath the shelf transfer edge. The X-Y motor control is coupled to a conventional X-drive motor 5120 and a conventional Y drive motor 5122. The microprocessor may also be coupled to a conventional sensor 5124 and a conventional camera 5126. The conventional camera and sensor may include suitable interface circuitry for sensing an article on a shelf, sensing trolley location and the like. The camera is also used for, and equipped with suitable interface software to image and item on a shelf and transfer that image to the computer with the control software.

The microprocessor may also be coupled to the non-orthogonal coupler control interface circuit 5144 for driving the motor 5146 engaging the non-orthogonal coupler. The non-orthogonal coupler control interface and or non-orthogonal coupler are as previously described. In addition, the microprocessor may also be coupled to a vibrator interface 1510 and a vibrator assembly 5112. The vibrator assembly is conventionally constructed and may be used to break a package from others disposed in a transfer clip.

The turret control 5104 includes a microprocessor 5138 and a wireless interface 5136 for coupling a turret control to the PC with the control software 5130. A suitable motor interface 5140 and motor 5142 are included to drive the turret according to commands received from the computer with control software. Alternatively, the pick trolley may issue commands through a wireless interface to control the turret as the trolley approaches the turret.

A computer network 5132 may be provided which may include a PC with control software 5130 and a wireless interface for communicating with the pick trolley 5128, the clip trolley and the turret controller. The computer network may also be coupled to various other client computers such as clip loading computers station terminals for data processing and like.

The clip trolley may be constructed similarly to the pick trolley. However, the XY motor control and the X & Y motors may be replaced with the suitable control circuit for removing a clip from the shelf for releasing and installing a new clip onto the shelf.

The invention claimed is:

1. An autonomous apparatus for transferring and organizing articles from a shelf surface into a container in response to an order from a single customer, the apparatus comprising:
   a bulk storage shelf located in a first area, the bulk storage shelf including a planar shelf surface for storing the articles in bulk;
   a rack shelf located in a second area separate from the first area, the rack shelf including a tilted shelf surface, opposed first and second ends, and opposed first and second sides each having lateral rails mounted thereon between the first and second ends;
   a clip trolley vehicle mounted to the rails for lateral movement thereon across the rack shelf between the first and second ends, the clip trolley vehicle carrying transfer channel clips loaded with transferred articles transferred from the bulk storage shelf, and the clip trolley vehicle for loading the transfer channel clips onto the tilted shelf surface of the rack shelf;
   each transfer channel clip includes a flooring surface, parallel walls, an end wall, an open transferring edge opposed from the end wall, and a screw assembly operatively coupled to a push-up surface for pushing articles in the transfer channel clip toward the transferring edge;
   a pick trolley vehicle mounted to the rails for lateral movement thereon across the rack shelf between the first and second ends, the pick trolley vehicle including a container and a coupler configured to engage with the screw assembly on one of the transfer channel clips to advance the push-up surface toward the transferring edge in response to activation of the coupler on the pick trolley vehicle, thereby pushing one of the articles in the one of transfer channel clips toward the container in the pick trolley vehicle; and
   a first sensor on the pick trolley vehicle configured to detect receipt of the article in the container on the pick trolley vehicle;
   wherein the pick trolley vehicle moves along the rails of the rack shelf in response to the first sensor detecting the receipt of the article in the container on the pick trolley vehicle.

2. The apparatus of claim 1, wherein:
   the coupler on the pick trolley vehicle advances toward the one of the transfer channel clips to engage with the screw assembly on the one of the transfer channel clips and engages with the screw assembly to advance the push-up surface; and
   the coupler on the pick trolley vehicle retracts from the one of the transfer channel clips to disengage with the screw assembly in response to the first sensor on the pick trolley vehicle detecting receipt of the article in the container on the pick trolley vehicle.

3. The apparatus of claim 1, further comprising a second sensor, located on the pick trolley vehicle, determines the number of articles remaining on the transfer channel clip on the rack shelf.

4. The apparatus of claim 1, further comprising:
   a camera on the pick trolley vehicle which captures images of each article on the rack shelf as the pick trolley moves laterally across the rack shelf; and
   a computer operatively coupled to the pick trolley vehicle compares the images of each article to a database of the articles and rack shelf locations for the articles.

5. The apparatus of claim 1, wherein:
   a conductor bar is mounted to the rails and delivers power to the pick trolley vehicle;
   a rack is mounted to the rails and engages with a pinion carried on the pick trolley vehicle to drive the pick trolley vehicle across the rails; and
   the conductor bar includes spaced-apart conductors extending between the first and second ends of each of the rails to provide power to the pick trolley vehicle between the first and second ends.

6. The apparatus of claim 1, further comprising:
   turning turrets disposed at the opposed first and seconds ends of the rack shelf;
   the turning turrets convey the clip trolley vehicles and the pick trolley vehicles between the rails mounted on the first and second rails.

7. The apparatus of claim 1, wherein the container carried by the pick trolley vehicle defines a shipping container for the articles received in the container.

8. The apparatus of claim 1, further comprising:
   a clip loading area located in a third area separate from the first and second areas;
   each transfer channel clip moves between a loading condition, a storage condition, and a transfer condition;
   in the loading condition of each transfer channel clip, the transfer channel clip is disposed in the clip loading area to be loaded with separated articles separated from the articles in bulk on the bulk storage area;
   in the storage condition of each transfer channel clip, the transfer channel clip is disposed on the tilted shelf surface of the rack shelf available to be picked from by the pick trolley vehicle; and
   in the transfer condition, the clip trolley vehicle carries the transfer channel clip from the clip loading area in the third area to the rack shelf in the second area.

* * * * *